(12) United States Patent
Dingel

(10) Patent No.: US 6,943,931 B1
(45) Date of Patent: Sep. 13, 2005

(54) ULTRA-HIGH LINEARIZED OPTICAL MODULATOR

(76) Inventor: Benjamin Dingel, 6 Dreams S., Painted Post, NY (US) 14870

(*) Notice: Subject to any disclaimer, the term of this patent is extended or adjusted under 35 U.S.C. 154(b) by 0 days.

(21) Appl. No.: 10/860,266

(22) Filed: Jun. 2, 2004

(51) Int. Cl.$^7$ ............................. G02F 1/01; G02F 1/035
(52) U.S. Cl. ............................... 359/279; 385/2; 385/8
(58) Field of Search .............................. 359/238, 254, 359/322, 278, 279, 245; 385/1, 2, 3, 4, 8, 385/9, 14, 15, 16, 24, 27, 31, 39, 40, 41, 385/130, 131, 132

(56) References Cited

U.S. PATENT DOCUMENTS

| | | | |
|---|---|---|---|
| 5,148,503 A | 9/1992 | Skeie | |
| 5,327,279 A | 7/1994 | Farina | |
| 5,768,378 A * | 6/1998 | Townsend et al. | 380/256 |
| 5,850,305 A | 12/1998 | Pidgeon | |
| 6,246,500 B1 | 6/2001 | Ackerman | |
| 2003/0020985 A1 * | 1/2003 | LaGasse et al. | 359/135 |

OTHER PUBLICATIONS

Y. Chiu, et al. "Broad-Band Electronic Linearizer for Externally Modulated Analog Fiber-Optic Links," Photonics Techn. Letters vol. 11, No. 1 Jan. 1999.
R. Sadhwani, et al. "Adaptive Electronic Linearization for Fiber," OFC 2003 vol. 2, pp. 477-479.
M. Nazarathy, et al., "Progress in external modulated AM CATV transmission systems", J. Lightwave Technol., vol. 11, pp. 82-105, Jan. 1993.
J. Schaffner, "Spur-Free Dynamic Range Measurements of a Fiber Optic Link . . . Wave Linearized Directional Coupler Modulators," Phon. Tech. Lett., vol. 6, 1994, pp. 273-275.

C.H. Bulmer, et al., "Linear 0-20 GHz Modulation with a 1×2 Directional Coupler," Photonics Technology Letters, vol. 3, No. 1, Jan. 1991, pp. 28-30.
M. L. Farwell, et al., "An Electrooptic Intensity Modulator with Improved Linearity"Photonics. Techn. Letters, vol. 3 No. 9, Sep. 1991, pp. 792-795.
G. Kanter, P. Capofreddi, S. Behtash, A. Gandhi, "Electronic Equalization for Extending the Reach of Electro-Absorption Modulator ," OFC 2003, vol. 2, pp. 476-477.
L.M. Johnson and H.V. Roussell "Reduction of intermodulation distortion in interferometric optical modulators," Optics Letters vol. 13, No. 10, Oct. 1988, pp. 928-930.
Edward I. Ackerman "Broad-Band Linearization of a Mach-Zehnder Electro optic Modulator," IEEE Trans. on Microwave Theory and Techniques, vol. 47, No. 12, 1999, pp. 2271-2279.
A. Loayssa, et al., "Linearization of Electro optic Modulators at Millimeter-wave Frequencies," 1999 LEOS 12th Annual Meeting Proceeding vol. 1, pp. 275-276.

(Continued)

Primary Examiner—Hung Xuan Dang
Assistant Examiner—Tuyen Tra

(57) ABSTRACT

The invented modulator provides ultra-high linearity (SFDR=147 dB-Hz), high tolerance, low loss, simple architecture, and low cost. It is based on unique combination of phase-modulator (PM) and ring resonator (RR) that are coupled to the arm(s) of standard Mach-Zehnder interferometer (MZI) configuration. It comprises of input port to receive optical signal 1, optical power separating means 2, interferometer arm length paths 3 & 4, bias controller mean 5, PM 6, RR 7 with coupler 17 having coefficient δ, optical power combining means 8, RF power splitting means 9, RF power source 10, and optical output signal 15. Both PM 6 and RR 7 are driven by same RF source 10 whose output power is divided into two parts with a split ratio of F:(1-F). The role of RR 7 is to provide the necessary non-linear phase-correction. It operates under non-resonance condition to avoid bandwidth narrowing. The dual modulation of PM 6 and RR 7 is an important factor in this invention.

25 Claims, 25 Drawing Sheets

OTHER PUBLICATIONS

William K. Burns, "Linearized Optical Modulator with Fifth Order Correction" Journal of Lightwave Technology, vol. 13 No. 8, 1995, pp. 1724-1727.

S. K. Korotky, et al., "Dual Parallel Modulation Schemes for Low-for Low-Distortion Analog Optical Transmission," IEEE J. on Sel. Areas in Comm., vol. 8 No. 7, 1990, pp. 1377-1381.

W. Bridges, and J. Schaffner, "Distortion in Linearized Electro optic Modulators," IEEE Trans. on Microwave Theory and Techniques, vo.43 No. 9, Sep. 1995, pp. 2184-2197.

N. Rengand, et al., "Novel Design for the Broadband Linearized Optical Intensity Modulator," IEEE Military Comm. Conference. MILCOM 2003. vol. 2, 13-16, 2003, pp. 1208-1212.

Xiaobo Xie, Jacob Khurgin, Jin Kang, and Fow-San Chow, "Linearized Mach-Zehnder Intensity Modulator," IEEE Photonics Technology Letters, vol. 15 No. 4, 2003, pp. 531-533.

Dingel and Izutsu, "Multifunction optical filter with a Michelson-Gires-Toumois . . . system applications," Optic Letters,, 1998, vol. 23, No. 14, pp. 1098-1101.

G.E. Betts, et al., "Optimization of externally modulated analog links," Devices for Optical Processing, D.M. Gookin, Ed. Proc. SPIE vol. 1562, pp. 2, pp. 281-302, 1991.

* cited by examiner

ULTRA-HIGH LINEARIZED OPTICAL MODULATOR

CROSS-REFERENCE TO RELATED APPLICATIONS

Non applicable

FEDERALLY SPONSORED RESEARCH

Non applicable

SEQUENCE LISTING OR PROGRAM

Non applicable

BACKGROUND OF THE INVENTION

1. Field of Invention

This invention relates to modulators for optical fiber communication and photonics analog fiber links systems. More specifically, it relates to a new class of optical modulators that provide ultra-linear signal transfer function to minimize non-linear distortion.

2. Prior Arts

In last several years, analog fiber-optics transmission links has found tremendous success in low-bandwidth (<1 GHz) commercial applications such as: cable television (CATV), cellular/personal communication, and fiber-radio access network. One key component in this analog fiber-optics transmission links is a linearized external modulator. Conventional external Mach-Zehnder interferometer (MZI) modulator has sine transfer function which introduces higher-order frequency distortion to the output signal. At low frequency modulation and with fixed radio frequency (RF) signal power level, electrically linearized MZI modulators are very effective, inexpensive, and simple technique to reduce non-linear distortion and thus increase the links' dynamic range. These are reported in technical papers such as Y. Chiu, B. Jalali, S. Garner, and W. Steier, "Broad-Band Electronic Linearizer for Externally Modulated Analog Fiber-Optic Links," Photonics Technology Letters vol. 11, no. 1 January 1999, pp. 48–50, R. Sadhwani, et al. "Adaptive Electronic Linearization for Fiber," OFC 2003 vol. 2, pp. 477–479, M. Nazarathy, et al., "Progress in external modulated AM CATV transmission systems", J. Lightwave Technol., Vol. 11, pp. 82–105, January 1993, and in patents, for example, such as U.S. Pat. No. 5,850,305 (Pidgeon, 1995) and U.S. Pat. No. 5,327,279 (Farina, 1994).

However, as the demands for analog fiber-optic links move toward high-density, high-channel-count commercial CATV and high-bandwidth (>10 GHz) military applications such as; antenna-remoting, beam forming for phased-array radars, and various weapon platforms, advanced external modulator components are needed to meet the more stringent and challenging requirements of these applications. These requirements include both wider bandwidth (DC-20 GHz), and greater link dynamic range (spurious-free dynamic range, SFDR>130 dB-Hz) performance. Furthermore, real-time, adaptive and deployable compensation architectures are necessary due to uncontrollable fluctuation of parameter values in the links/environment. Moreover, all these requirements must be accomplished while minimizing the cost, and reducing the overall complexity of the links system at the same time.

One emerging component that has the potential to meet these requirements is an optically linearized MZI modulators rather than electrically linearized MZI modulators. Other general approaches like (a) directly-modulated lasers have still limited bandwidth (<3 GHz) while (b) optically linearized directional coupler modulators (DCMs) and (c) linearized electro-absorption modulators (EAMs) involve costly fabrication improvements, complicated techniques, and long-term development.

Previous works related to DCMs and EAMs are reported, for example, in technical papers such as: J. Schaffner, J. F. Lam, C. J. Gaeta, G. L. Tangonan, R. L. Joyce, M. L. Farwell and W. S. C. Chang, "Spur-Free Dynamic Range Measurements of a Fiber Optic Link with Traveling Wave Linearized Directional Coupler Modulators," Photonics Technology Letters, vol. 6, No. 2, February 1994, pp. 273–275, C. H. Bulmer, W. K. Burns, and C. W. Pickett "Linear 0–20 GHz Modulation with a 1×2 Directional Coupler," Photonics Technology Letters, vol. 3, no. 1, January 1991, pp. 28–30, M. L. Farwell, Zong-Qi Lin, Ed Wooten, and William S. C. Chang "An Electrooptic Intensity Modulator with Improved Linearity" Photonics. Techn. Letters, vol. 3 no. 9, September 1991, pp. 792–795, and G. Kanter, P. Capofreddi, S. Behtash, A. Gandhi, "Electronic Equalization for Extending the Reach of Electro-Absorption Modulator," OFC 2003, vol. 2, pp. 476–477.

Optically linearized MZI-based modulators offer lesser technological risk, greater reliability and more realistic cost-effective fabrication since (i) the physics/operation of MZI is already well studied, (ii) it uses matured inorganic materials (i.e. Lithium Niobate, semiconductor GaAs, polymers), and (iii) it employs well-established manufacturing technology.

Existing optically linearized MZI-based modulators can be categorized into three broad groups namely: (1) dual-signal MZI modulator, (2) cascaded MZI modulator, and (3) resonator-assisted modulator. The first group uses a single standard MZI modulator with two injected optical signals in the form of (1.1) two polarizations as in the case reported, for example, by L. M. Johnson and H. V. Roussell "Reduction of intermodulation distortion in interferometric optical modulators," Optics Letters vol. 13, no. 10, October 1988, pp. 928–930, (1.2) two wavelengths as in the case reported by Edward I. Ackerman, "Broad-Band Linearization of a Mach-Zehnder Electro optic Modulator," IEEE Transactions on Microwave Theory and Techniques, vol. 47 no. 12, 1999, pp. 2271–2279, and U.S. Pat. No. 6,246,500, and (1.3) bi-directional signals as in the case reported by A. Loayssa, M. Alonso, D. Benito and M. J. Garde "Linearization of Electro optic Modulators at Millimeter-wave Frequencies," IEEE 199912$^{th}$ LEOS Annual Meeting, Proceeding Vol. 1, pp. 275–276.

Its major advantages are simplicity and low-cost. The improvement in spurious-free dynamic range, SFDR is generally in the range of 5 to 15 dB compared with standard non-linearized MZI modulator. Its major disadvantages are design inflexibility, non-optimum performance, and tight tolerance requirements.

The second group consists of two or more standard MZI modulators connected in series arrangements as reported, for example, in William K. Burns, "Linearized Optical Modulator with Fifth Order Correction" Journal of Lightwave Technology, vol. 13 no. 8, 1995, pp. 1724–1727, U.S. Pat. No. 5,148,503 (Skeie, 1992), or in parallel configurations as reported, for example, in S. K. Korotky, R. M. Ridder, "Dual Parallel Modulation Schemes for Low-Distortion Analog Optical Transmission," IEEE Journal on Sel. Areas in Comm., vol. 8 no. 7, 1990, pp. 1377–1381). It is a generalization of the first group and offers higher SFDR improvement by 10–20 dB (William B. Bridges, and James H. Schaffner, "Distortion in Linearized Electro optic Modulators," IEEE Transactions on Microwave Theory and Techniques, vo. 43 no. 9, September 1995, pp. 2184–2197).

The major drawbacks of these designs are tight tolerance requirements, huge optical losses, increased power penalty expensive cost since it requires multiple modulators. Furthermore, multiple parameters need precise control that lead to complicated compensation arrangement.

The third group can be referred to as resonator-assisted external modulator. Its basic optical configuration is very similar to the set-up used in optical filtering. X. Xia proposed MZI with ring resonator(s) (RR) coupled in the arm(s) of the interferometer as reported in Xiaobo Xie, Jacob Khurgin, Jin Kang, and Fow-San Chow, "Linearized Mach-Zehnder Intensity Modulator," IEEE Photonics Technology Letters, vol. 15 no. 4, 2003, pp. 531–533 while N. Rengand employed Gires-Tournois resonator (GTR) in Michelson interferometer (MI) configuration as published in N. Rengand, I. Shpantzer, Ya. Achiam, A. Kaplan, A. Greenbalatt, G. Harston, P. S. Cho, "Novel Design for the Broadband Linearized Optical Intensity Modulator," IEEE Military Communications Conference. MILCOM 2003. Vol. 2, 13–16, 2003, pp. 1208–1212. Both resonators are operated in the non-resonance region to avoid the bandwidth narrowing. Preliminary studies indicate that 5–15 dB improvement can be achieved. However, it is still limited to less 20 dB improvement and tight tolerance requirements.

In general, all these reported modulators are expensive, have significant optical insertion loss, high power penalty, and only moderate dynamic range improvement. More importantly, all these modulators necessitate complicated optical arrangement to perform dynamic compensation. Thus, there is an urgent need for linearized external modulators that overcome the aforementioned shortcomings in a simple, effective, and economical ways.

BACKGROUND OF THE INVENTION—OBJECTS AND ADVANTAGES

It is therefore an object of this present invention to provide an improved and compelling external modulator design that has exceptional linearity (SFDR=142.4 dB-Hz), wideband capability (DC-20 GHz), simple optical configuration, high tolerance and uncomplicated compensation architecture.

The present invention achieves a significant leap forward in overcoming prior linearized modulator deficiencies and offer significant RF fiber optic link improvements compared with prior arts.

SUMMARY OF THE INVENTION

In this invention, we will present a new family of optically linearized external MZI modulator with three subsequent generic architectures that will lead to huge improvement in the dynamic range and simple structure. We will refer to these generic architectures as (1) MZI-type linearized external modulator, (2) Michelson interferometer (MI)-type linearized external modulators, and (3) Sagnac interferometer (SI)-type linearized external modulator. The reason for these labels will become apparent in the discussion below. Each of these architectures has numerous specific implementations or embodiments.

In all these different architectures, the arms of the interferometer contain at least a pair of phase modulator (PM) and ring resonator/modulator (RR) that are coupled either in series or in parallel to the arm(s) of the interferometer. Furthermore, the arm length difference is set to correspond to an inflection point (quadrature bias) where the second-order intermodulation distortion is zero. Moreover, the PM and RR are driven by the same RF power source whose output power is dividing into two parts by RF power splitting means with a ratio of F:(1-F) before they are fed to the respective electrodes of PM and RR.

In the first generic architecture of the present invention, the basic configuration is a modified MZI having one PM and one RR coupled to its arms. In one specific embodiment, the PM and RR are connected in series in one arm of the interferometer while the other arm contains no PM or RR elements. In another embodiment, the PM and RR are separately coupled to the two respective arms of the interferometer. Furthermore, these two embodiments can be generalized by increasing the number of PM and RR coupled onto the arms of the MZI. These are depicted as separate embodiments.

Moreover, in another implementation of the basic idea of the modulator, the conventional two-arm MZI can be further generalized by increasing the number of arms of the MZI into N-arm where N more than 2. In this N-arm MZI modulator, the number of PM and RR could be more than one. This is again contained in a separate embodiment. In all these embodiments, a simple adaptive compensation scheme can be incorporated to these embodiments by simply adding an optical top to obtain a feedback signal and a processor module to generate the necessary electrical control signals to adjust the parameters such as the coupler coefficient of the RR and the splitting ratio of the RF power splitter.

In the second generic architecture of the present invention, the basic configuration is a modified MI having one PM and one RR coupled to its arms. It can be considered as a reflective type of MZI. Just like the MZI-type invention, other implementations are possible. These embodiments have comparable configurations and conditions as described in the first generic architecture except that it is now in reflective mode.

In the third generic architecture of the present invention, the basic configuration is a modified SI having one PM and one RR coupled to its arm which forms a close loop. In this architecture, the optical splitter is a polarization-based so that two polarized beams propagate along the loop in opposite direction. By choosing the proper material for the waveguide arm of SI, the arm length difference traversed by the two polarization signals can be set to correspond to an inflection point (quadrature bias) where the second-order intermodulation distortion is zero. Just like the MZI-type and MI-type modulators, other implementations are possible with SI-type modulator. These embodiments have analogous configurations and conditions except for the loop arrangement.

In all these embodiments, the final output signal possesses ultra-high linearity. This linearity is evaluated by calculating the performance of SFDR when the invented external modulator is used in a typical photonic fiber links. The resultant SFDR improvement provides as much as 30 dB compared with conventional MZI modulator. Unlike most exiting linear modulator, the present invention also offer high tolerance from any parameter fluctuations. Due to its simple architecture, easy and well complicated fabrication is possible that would lead to low cost production.

Figure 1:
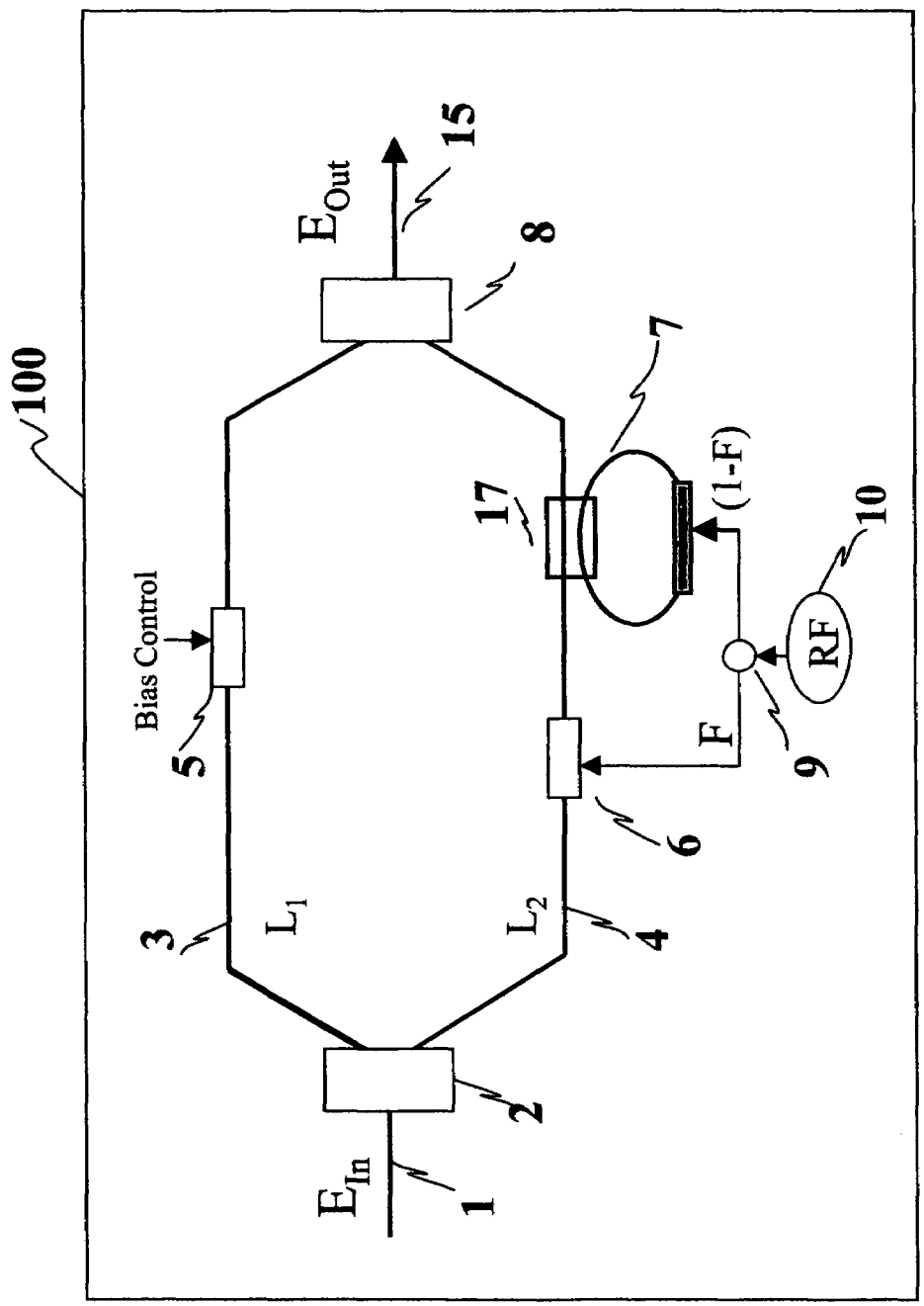
FIG. 1 Functional schematic of the ultra-linear external modulator consisting of a modified MZI coupled with a phase modulator (PM) and ring resonator (RR) in one arm of the MZI (PM-RR-MZI modulator for short).

Table 1: Parameters used in the calculation of the SFDR in a typical photonic fiber links.

DRAWING—REFERENCE NUMBER

1 Input signal
2 Optical power separating means
3,4 Arms of the MZI
5 Bias control means
6, 6-1, 6-2, . . . , 6-$m$, 6-N Phase modulator
6, 6-$y$1, 6-$y$2, . . . , 6-$y$N Phase modulator
7, 7-1, 7-2, 7-$m$, 7-N Ring Resonator
7, 7-$y$1, 7-$y$2, . . . , 7-$y$N Ring Resonator
8 Optical power combining means
9, 9-1, . . . , 9-N RF power splitter
10, 100, 100-1, . . . , 100-N RF power source
11 Feedback Signal
12, 21-1, . . . , 12-N Electrical control signal from Processor
12', 21-1', . . . , 12-N' Electrical control signal from Processor
13 Optical tap
14 Processor module
15 Optical output signal
17 coupler's transmission coefficient of the ring resonator
20 Optical power separating/combining means
25 Optical power separating means with multiple arms
26 Polarization-based bias control means
27 2×2 polarization-based Optical power dividing/combining means
30 Reflector
40 2×2 Optical power dividing/combining means
45 45-degree rotator means
50 Input optical signal injected onto APR/M
55 Output optical signal injected onto APR/M
70 All-Pass Resonator/Modulator (APR/M)
71 back reflector mirror of Gires-Tournois Resonator (GTR)
73 front surface reflector mirror of Gires-Tournois Resonator (GTR)
77 front grating reflector of Fiber Bragg Grating
78 Fiber Bragg Grating (FBG)

79 back grating reflector of Fiber Bragg Grating (FBG)
80 Optical power combining means with multiple arms
90, 90-1, . . . 90-N RF power splitter
91 RR with coupled reflector as implementation of APR/M
92 GTR as the implementation of the all-pass resonator
93 FBG-based implementation of GTR as all-pass resonator
100 PM-RR-MZI modulator
130 RF signal conditioning means
200 PM-RR-MZI modulator with adaptive compensation
300 Parallel PM-RR-MZI modulator
400 Parallel PM-RR-MZI modulator with adaptive compensation
500 Generalized PM-RR MZI Modulator
600 PM-APR/M MI Modulator with adaptive compensation
700 Parallel PM-APR/M MI Modulator with multiple arms
800 Generalized PM-APR/M MI Modulator with adaptive compensation
900 PM-APR/M MI Modulator
1000 PM-APR/M MI Modulator with adaptive compensation
1100 Parallel PM-APR/M MI Modulator
1200 Parallel PM-APR/M MI Modulator with adaptive compensation
1300 Generalized PM-RR/M MI Modulator
1400 Generalized PM-RR/M MI Modulator with adaptive compensation
1500 PM-RR SI Modulator
1600 PM-RR SI Modulator with adaptive compensation
1700 Generalized PM-RR SI Modulator
1800 Generalized PM-RR SI Modulator with adaptive compensation

DETAILED DESCRIPTION OF THE INVENTION

Figure 6:
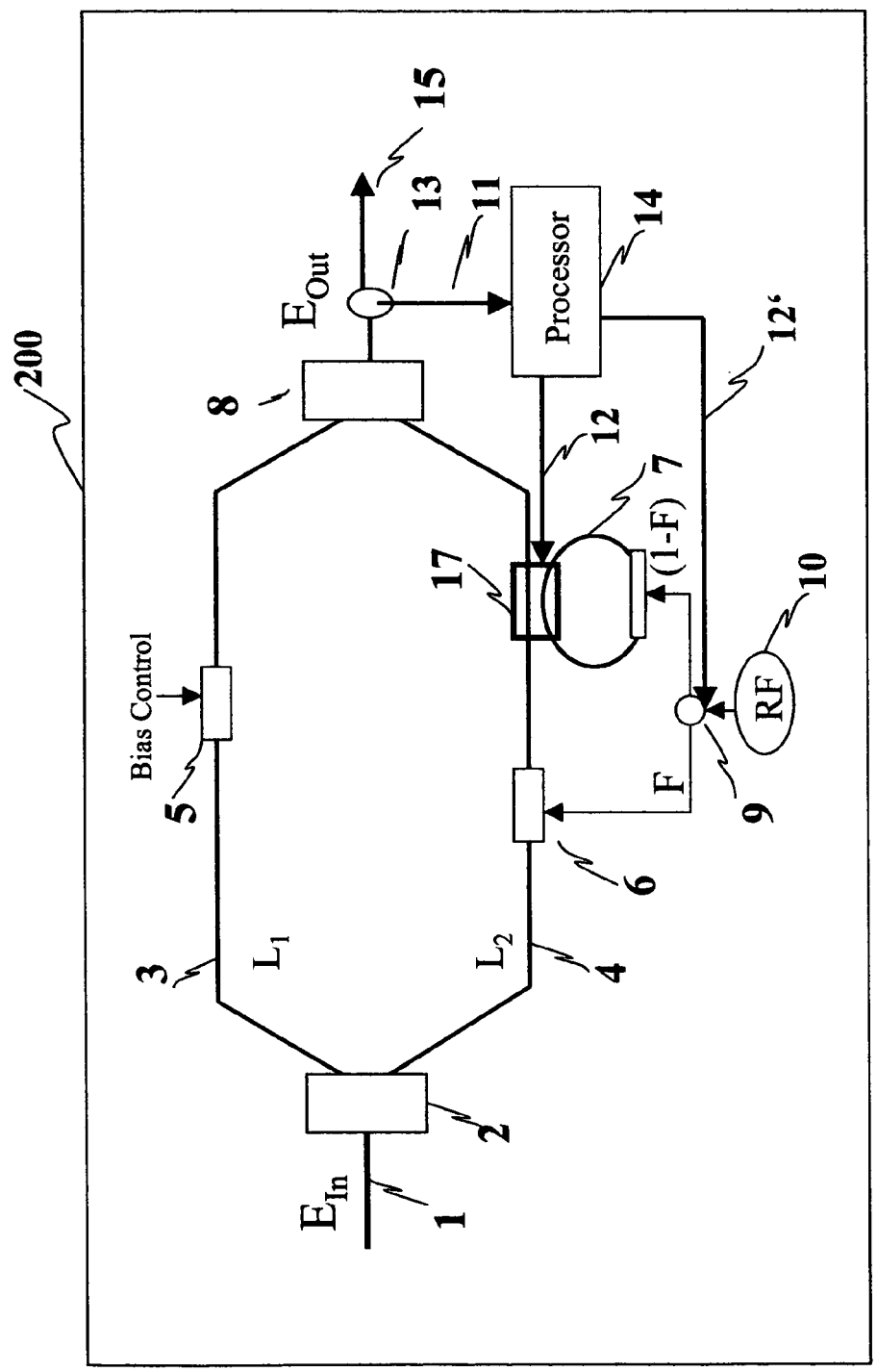
FIG. 6 PM-RR-MZI modulator with very simple but powerful and adaptive compensation scheme.

FIG. 1 and FIG. 6 PREFERRED EMBODIMENTS:

Methods and apparatus for improving the linearity of optical modulator are described. In this invention, we will present a new family of optically linearized external MZI modulator with three subsequent generic architectures that provide huge improvement in the SFDR while maintaining a simple structure. We will refer to these generic architectures as (1) MZI-type linearized external modulator, (2) Michelson interferometer (MI)-type linearized external modulators, and (3) Sagnac interferometer (SI)-type linearized external modulator. The reason for these labels will become apparent in the discussion below. Each of these architectures has different implementations or embodiments.

In the following description of the invention, for purposes of clear and gradual progression of the explanation, numerous specific details are set forth and explain in the following order. We will present first generic embodiment of the proposed linearized external modulator and then describe some specific embodiments. Next, we describe the second generic embodiment and provide some specific embodiments. Lastly, we discuss the third generic embodiment with its subsequent specific embodiments. In this manner, we will provide thorough understanding of the various aspects of this invention.

With these descriptions, it will be apparent to one skilled in the art that the invention can be modified or further extended in accordance to the general principle and spirit of the present invention. Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment. Again, various changes, substitutions, and alternations can be made herein, without departing from the principle and the scope of the invention. Accordingly, a skilled artisan can design a linearized modulator in accordance with the present invention, to best suit a given application. For the purpose of illustrating the concepts of the invention, it is to be understood that the drawings might not be actual scaled.

DETAILED DESCRIPTION

FIG. 1 and FIG. 6 PREFERRED EMBODIMENTS:

FIG. 1 depicts the functional block diagram of the first embodiment of the ultra-linear external MZI modulator according to the present invention. The configuration 100 comprises of a modified Mach-Zehnder interferometer (MZI) with an input port to receive optical signal 1, optical power separating means 2, interferometer arm length paths 3 & 4, bias controller mean 5, phase modulator (PM) 6, ring resonator/modulator (RR) 7 with a coupler 17 having a coefficient 6, optical power combining means 8, RF power splitting means 9, RF power source 10, and optical output signal 15. We will refer to this modulator as "PM-RR MZI modulator".

The optical signal 1 which may takes the form of a single wavelength or multi-wavelength signal is split by optical power separating means 2 into two (or more) portions. Optical power separating means 2 and optical power combining means 8 might have uneven splitting power ratio as well as variable or adjustable power ratio. It may take the form of, but not limited to 1×2 Y-junction splitter, 2×2 directional coupler (DC), waveguide polarization beam splitter or beam combiner. The interferometer arm length paths are denoted by $L_1$, 3, and $L_2$, 4, but in general, it might have more than two arm paths to correspond to the number of power splits of optical separating means 2. A bias control means 5 controls the path length difference between the arms of the interferometer. The interferometer may take the form of a non-polarized MZI or polarized MZI.

The PM 6 and RR 7 are arranged in series (FIG. 1) or in parallel (FIG. 9), and are coupled to the arm(s) of the interferometer. Both are driven by the same RF power source 10 whose output power is dividing into two parts by RF power splitting means 9 with a ratio of F:(1-F) before they are fed to the respective electrodes (not shown) of PM 6 and RR 7. The F can take the value from 0 to 1. The RR 7 may take the form of, but not limited to waveguide-based ring resonator, photonic bandgap (PBG)-based ring resonator, or micro-ball-based ring resonator. Furthermore, these RR 7 implementations may take the form of, but not limited to ring resonators with fixed coefficient δ or adjustable coefficient δ.

In terms of operation for the case shown in FIG. 1, a light beam incident onto PM-RR MZI modulator is split into two beams E1 and E2 of equal intensity by optical power separating means 2. Beam E1 propagates through arm $L_1$ of the interferometer, while beam E2 propagates through arm $L_2$ where PM 6 and RR 7 are coupled in series. Then both beams E1 and E2 are added coherently by the optical power combining means 8 to give the resultant output electric field 15, $E_{out}$ as:

$$E_{Out} = \frac{E_0}{2} e^{-i(k\eta L_1)} + \frac{E_0}{2} e^{-i(k\eta L_2 + K\eta d_{pm} + \Theta(\delta, d_{rr}))} \qquad \text{Eq. 1}$$

where $E_o$ is the optical field amplitude input to PM-RR-MZI modulator, $K\eta d_{pm}$ is the modulating phase term of the PM 6, $\eta$ is the index of refraction, and $d_{pm}=\eta d_0$ is the modulating length. The phase response of RR 7, $\Theta(R,d_{rr})$ [Dingel and Izutsu, "*Multifunction optical filter with a Michelson-Gires-Tournois interferometer for wavelength division multiplexed network system applications,*" *Optic Letters*, 1998, vol. 23 no. 14, pp. 1098–1101] is given as:

$$\Theta(\delta, d_{rr}) = -2\text{Tan}^{-1}\left[\frac{\{1+\delta\}}{\{1-\delta\}} \text{Tan}[k\eta d_{rr}/2]\right] \qquad \text{Eq. 2}$$

where $\delta$ is the a coupler's transmission coefficient 17, and $d_{rr}$ is the circumference length of the RR 7. The RR 7 is operated under non-resonance condition to avoid bandwidth narrowing. This implies that $d_{rr}$ is set to be odd multiple of the half operating wavelength of the optical signal.

Assuming $d_{rr}=2d_{pm}$, and setting $K\eta(L_2-L_1)=(2m-1)\pi/2$ through the use of bias control means 5, we operate the PM-RR-MZI modulator at an inflection point (quadrature bias) where the second-order intermodulation distortion is zero. The corresponding output intensity is then given as $$I_{out} = |E_{out}|^2 = \frac{(E_0)^2}{2}(1 + \text{Sin}(K\eta d_{pm} + \Theta(\delta, 2d_{pm})) \qquad \text{Eq. 3}$$

The role of RR 7 is to provide the necessary non-linear phase-correction onto one of the beam without affecting its amplitude. The dual modulation of PM 6 and RR 7 is an important factor in this new modulator. Our proposed modulator can be considered as a generalization of both the conventional MZI and the resonator-assisted MZI (RAMZI). The proposed modulator reduces to a standard MZI modulator if RR 7 is eliminated, while it becomes a resonator-assisted MZI modulator if the PM 6 is removed.

Using the well-known two-tone test where the input signal consists of equal amplitudes at two frequencies ($\omega_1$ & $\omega_2$) and employing the RF-photonic link parameters listed in Table 1, we can calculate SFDR of a typical analog fiber links with our invented modulator under the assumption of a small-signal approximation as described in reference [G. E. Betts, L. Johnson, and C. H. Cox, III, "*Optimization of externally modulated analog links,*" *Devices for Optical Processing*, D. M. Gookin, Ed. Proc. SPIE vol. 1562, pp. 281–302 (1991)]. The parameters are similar to that used in previous studies (W. B. Bridges, and James H. Schaffner, "*Distortion in Linearized Electro optic Modulators,*" *IEEE Transactions on Microwave Theory and Techniques*, vo. 43 no. 9, September 1995, pp. 2184–2197) except for the modulator sensitivity $V_\pi$ which reflects the current external modulator technology. In order to determine the optimum values of F and $\delta$ for maximum dynamic range (SFDR), we expand all the Sine terms in a Fourier series to separate the signal, odd harmonics, and the intermodulation products. The coefficients in these well-known series are the products of Bessel functions.

Figure 2:
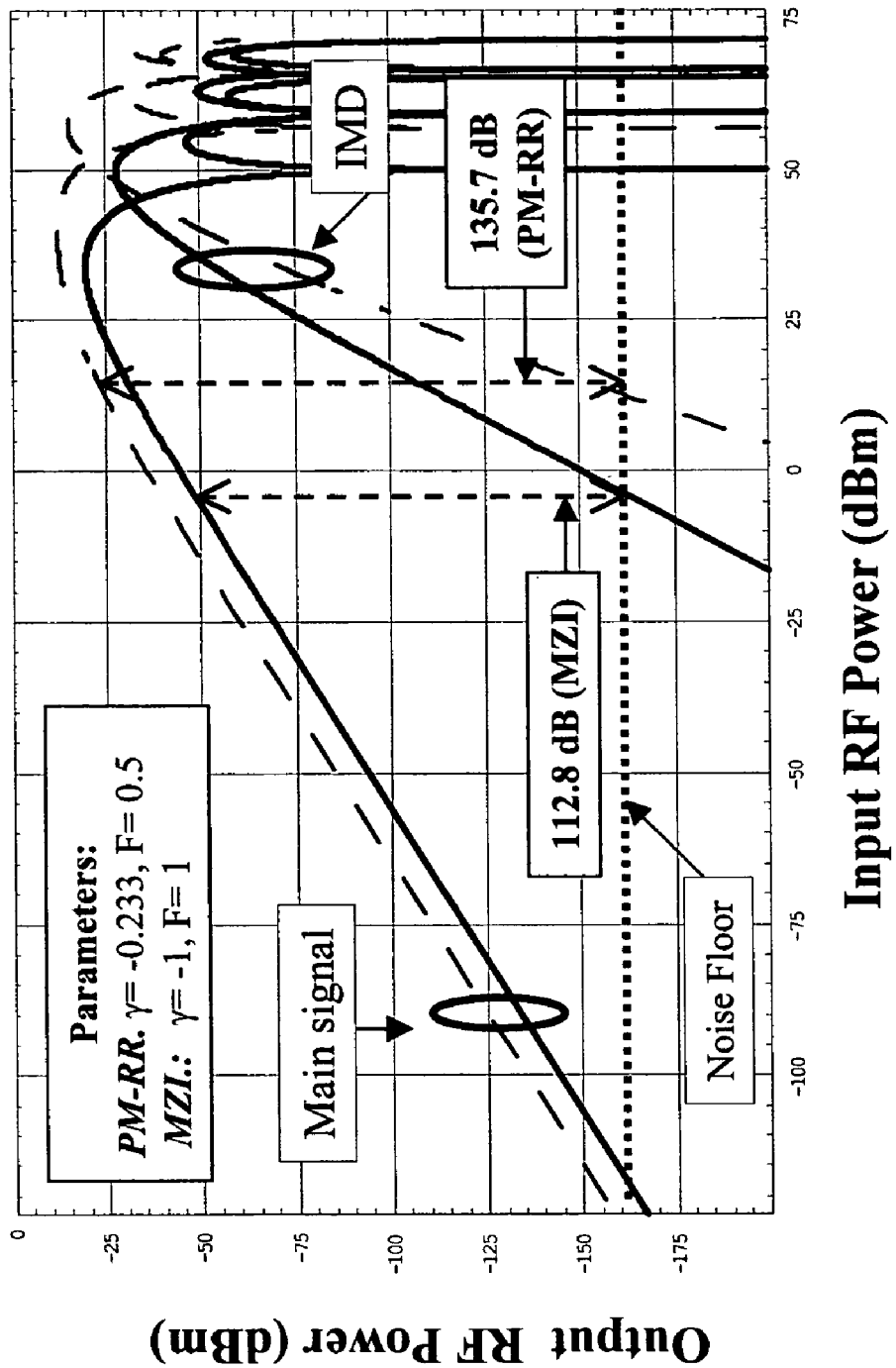
FIG. 2 The main and IMD signals of PM-RR-MZI modulator (Non-optimized condition: $\gamma = -0.233$ for a given noise floor level$=-160$ dB) provide 23 dB SFDR improvement compared with conventional MZI.

FIG. 2 shows one of the remarkable features of PM-RR-MZI modulator—ultra-high SFDR value. It depicts the output RF main signal power and the third-order intermodulation power as a function of the input RF power for a fiber-optic link where $\gamma$ and F are equal to -0.233 and ½, respectively. The noise floor level is set to -160 dB. Since F=½, the RF input power is evenly divided between the PM and RR. This leads to simplified configuration and ease of operation. To reduce the proposed external modulator to a standard MZI, we need only to set F and $\gamma$ equal to 1 and -1, respectively. Physically, this means all RF power signal is directed to PM only. The RR becomes functionally absent since $\gamma$ is equal to -1.

Figure 3:
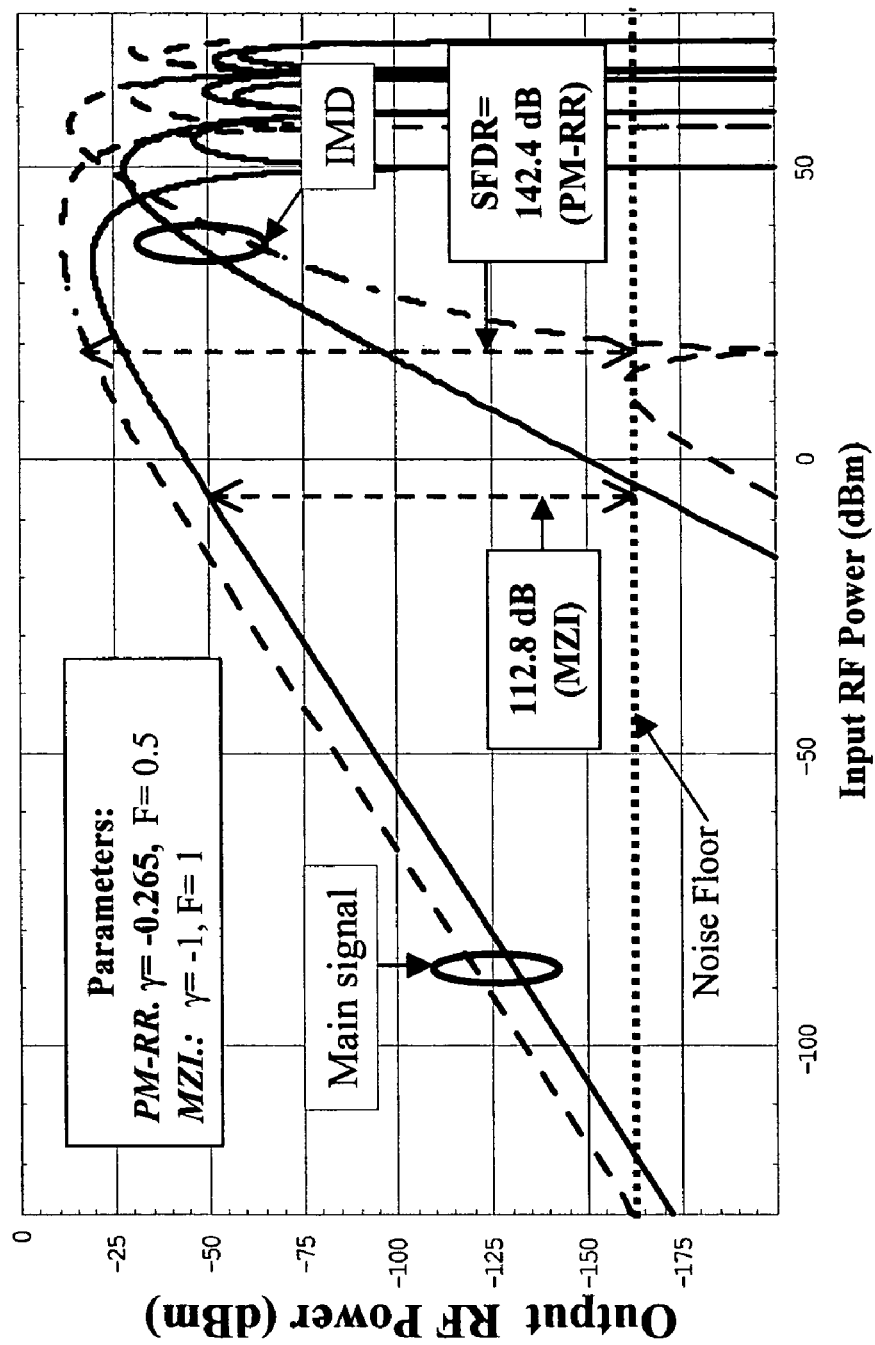
FIG. 3 The main and IMD signals of PM-RR-MZI modulator (Optimized condition: $\gamma = -0.265$ for a given noise floor level $=-160$ dB) provide 30.0 dB SFDR improvement compared with conventional MZI.

As seen in FIG. 2, the resultant SFDR is equal to -135.7 dB-Hz compared with the standard MZI having a SFDR of -112.7 dB-Hz. This gives a superior 23 dB improvement. This improvement is obtained under the cubic cancellation (non-optimized) condition. It cancels the cubic term in the Bessel function expansion while other higher power terms ($5^{th}, 7^{th}, 9^{th}, \ldots$) remain. Further improvement in SFDR can be realized if the $5^{th}$ term in the Bessel expansion is set near zero by setting the coupler's coefficient $\gamma$ to -0.265, as shown in FIG. 3. The effective SFDR is now equal to 142.4 dB Hz, which is exceptionally very high. Compared with the standard MZI, the overall gain is nearly 30.0 dB. To the best of our knowledge, this is the highest reported SFDR for any linearized external modulators.

Figure 4:
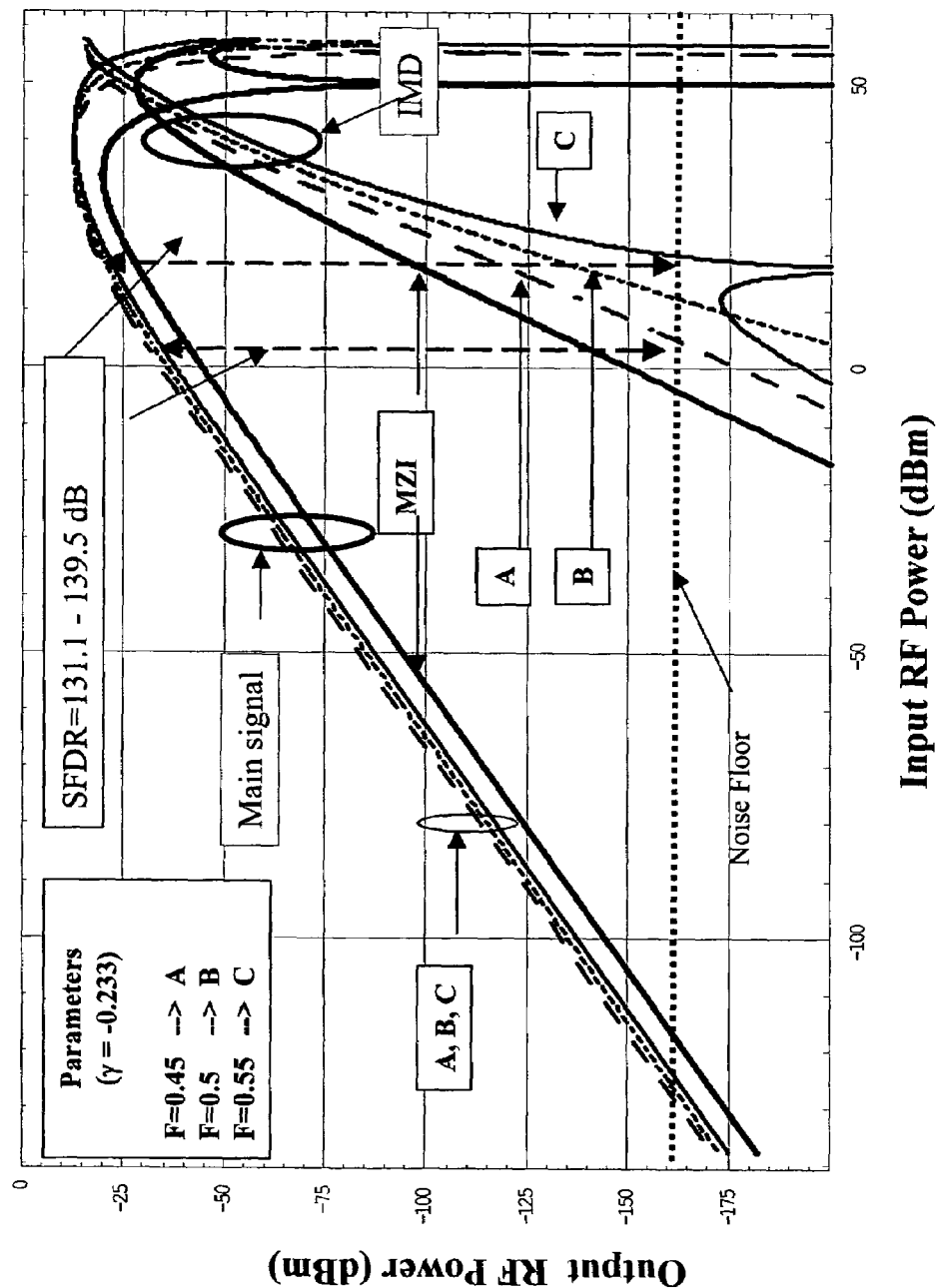
FIG. 4 Dynamic variation in the RF power ratio F (0.45–0.55) has minimum effect on main signal but considerable impact on IMD signal which lead to increase (F>0.5) or decrease (F<0.5) of SFDR for a fixed coupler's coefficient, $\gamma=-0.233$.

Another superior feature of this modulator is high tolerance to parameter fluctuation. FIG. 4 shows the effect of +/-10% RF input power level fluctuation but with a fixed $\gamma$ (=-0.233) value. The proposed modulator exhibits high tolerance to dynamic changes in RF power level. At the same time, it provides a very stable, excellent and high SFDR value that ranges from 131.1 dB to 139.5 dB. The shape and power level of the main signal are basically unchanged as indicated by A, B, and C in FIG. 4. However, IMD signal is significantly modified. Decreasing the value of F (from 0.5 to 0.45) reduces the slope of the IMD line as indicated by line A compared with line B. This lowers the SFDR value from 135.6 dB-Hz to 131.1 dB-Hz. On the other hand, if F is increased, the slope of the corresponding IMD line becomes steeper with a "kink" appearing in the bottom of the line. As long as the tip of the "kink" is lower than the noise floor level, the resultant SFDR is increased to 139.5 dB-Hz.

Figure 5:
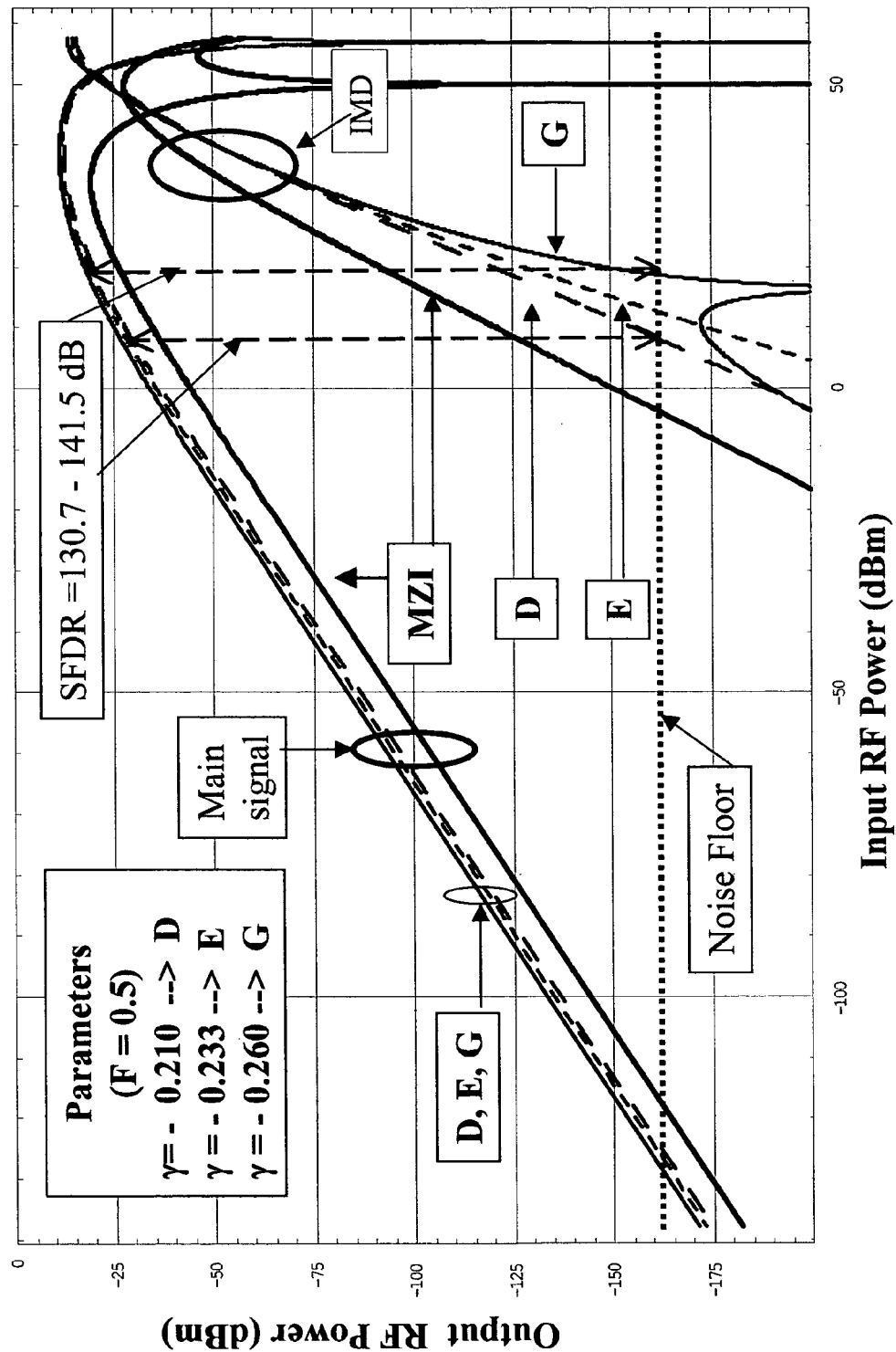
FIG. 5 Dynamic variation in RR coupler's coefficient is similar to variation in the RF power ratio. The impact is negligible for the main signal but noticeable on IMD signal. This leads to increase ($\gamma>-0.233$) or decrease ($\gamma<-0.233$) of the SFDR for a given RF power ratio.

In another case, if the parameter F is held fixed (F=0.5) while $\gamma$ is allow to fluctuate, the proposed modulator still maintain high SFDR value that oscillate between 130.7 dB to 141.5 dB, as shown in FIG. 5. Just like the previous discussion, the main signal is unaffected while the IMD signal is significantly modified. Decreasing the value of $\gamma$ from -0.233 lowers the SFDR value to 130.7 dB from 135.6 dB while increasing the value $\gamma$ improves the SFDR from 135.6 dB to 141.5 dB. Both FIG. 4 and FIG. 5 show that the proposed external modulator offers high tolerance characteristics to any fluctuations from RF power level F, and coupler's coefficient $\gamma$ while maintaining an excellent SFDR at the same time.

Figure 7:
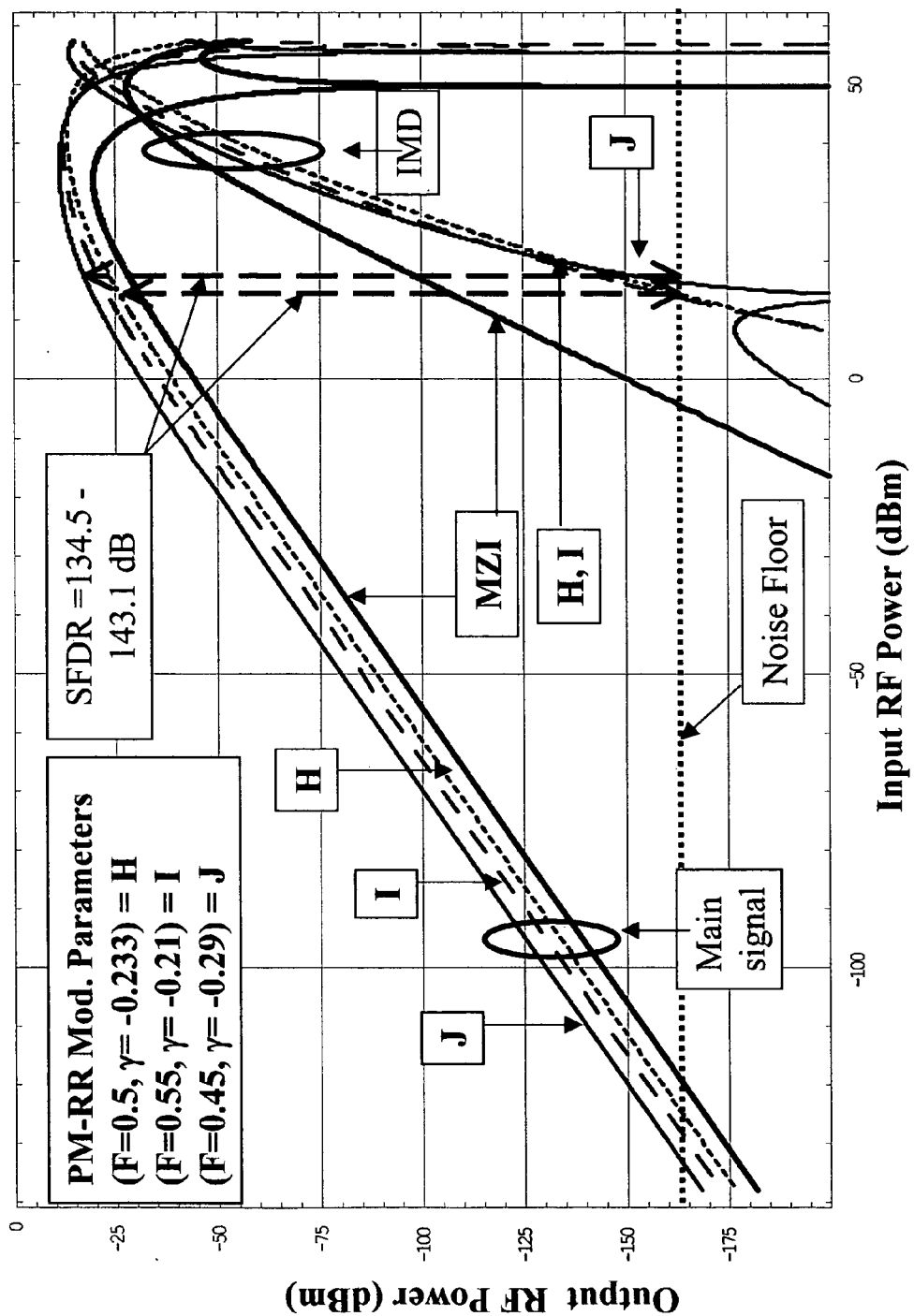
FIG. 7 Any variation ($\Delta \sim +/-20\%$) in RF power ratio, F is compensated with a simple adjustment of coupler's coefficient $\gamma$ ($\gamma$ 0.18–0.30) of the RR to maintain at least SFDR= 134.5 dB-Hz.

Another superior feature of PM-RR-MZI modulator is its simple yet powerful, and straightforward architecture to compensate for dynamic changes in the parameters. Most existing linearized modulators require complicated compensation schemes due to multiple parameters that need to be controlled precisely. However in our modulator, we need only one parameter to adjust in order to compensate any fluctuation in RF power level. This leads to a very simple arrangement as depicted in FIG. 6. It represents as the second specific embodiment 200 of the present invention where the first embodiment 100 is configured with an adaptive compensation scheme. Here a portion of the output signal is tapped by an optical tap 13 as feedback signal (FS) 11, and used as input to a processor module 14. Then the module 14 generates the required electrical output signals 12 and 12' to adjust the parameters γ and F, respectively. The basic idea is to adjust parameter γ dynamically to compensate for any fluctuation in RF power level, and visa versa. In other words, we use both mechanisms found in FIG. 4 and FIG. 5 simultaneously to balance one another. FIG. 7 shows the RF output signal, IMD signal and SFDR when both F and γ are "balanced" to compensate for the changes in RF power level. Changes in the RF power level by about 20% can easily be compensated with appropriate adjustment of the coupler γ within the ranges of −0.21 to −0.29. The high SFDR is still maintained at amazing value [134.5–143.1 dB-Hz].

Figure 8:
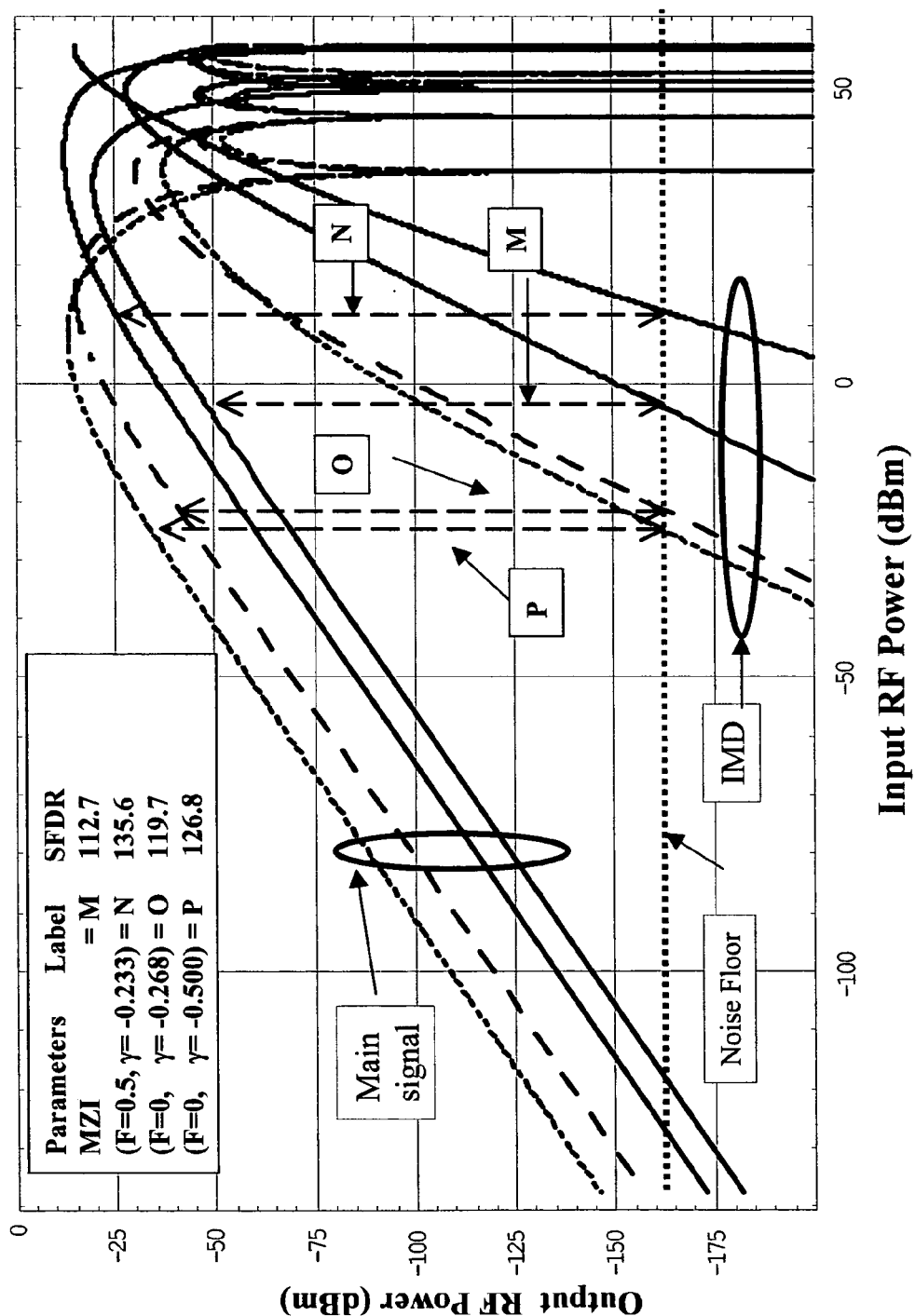
FIG. 8 Comparison of the SFDR between PM-RR-MZI and RAMZI. The SFDR of conventional MZI is also shown.

As mentioned earlier, the present invention can be considered as a generalization of the reported resonator-assisted MZI (RAMZI) that employed resonator(s) inside the MZI or MI. Key factors that need to be considered in operating the PM-RR-MZI and RAMZI for broadband applications are (i) RR must operate in non-resonance condition and (ii) use low value of γ as much as possible. Here we compare the performance of present invention with RAMZI on these two factors. FIG. 8 shows that the dynamic range of present invention is better than RAMZI. First, the present invention has higher SFDR value (135.7 dB-Hz compared with 119.7 dB-Hz) even for lower γ=−0.233. Second, lower value of γ leads to wider bandwidth.

Another important advantage of PM-RR-MZI modulator is its low-cost potential. This is due to the ff. reasons namely; (i) simple optical design, (ii) use of commercially available design of MZI with simple modification, and (iii) uncomplicated compensation architecture. All of these favorable factors reduce the cost of the overall device and RF photonic link system.

FIG. 9 to FIG. 14—Additional Embodiments

Figure 9:
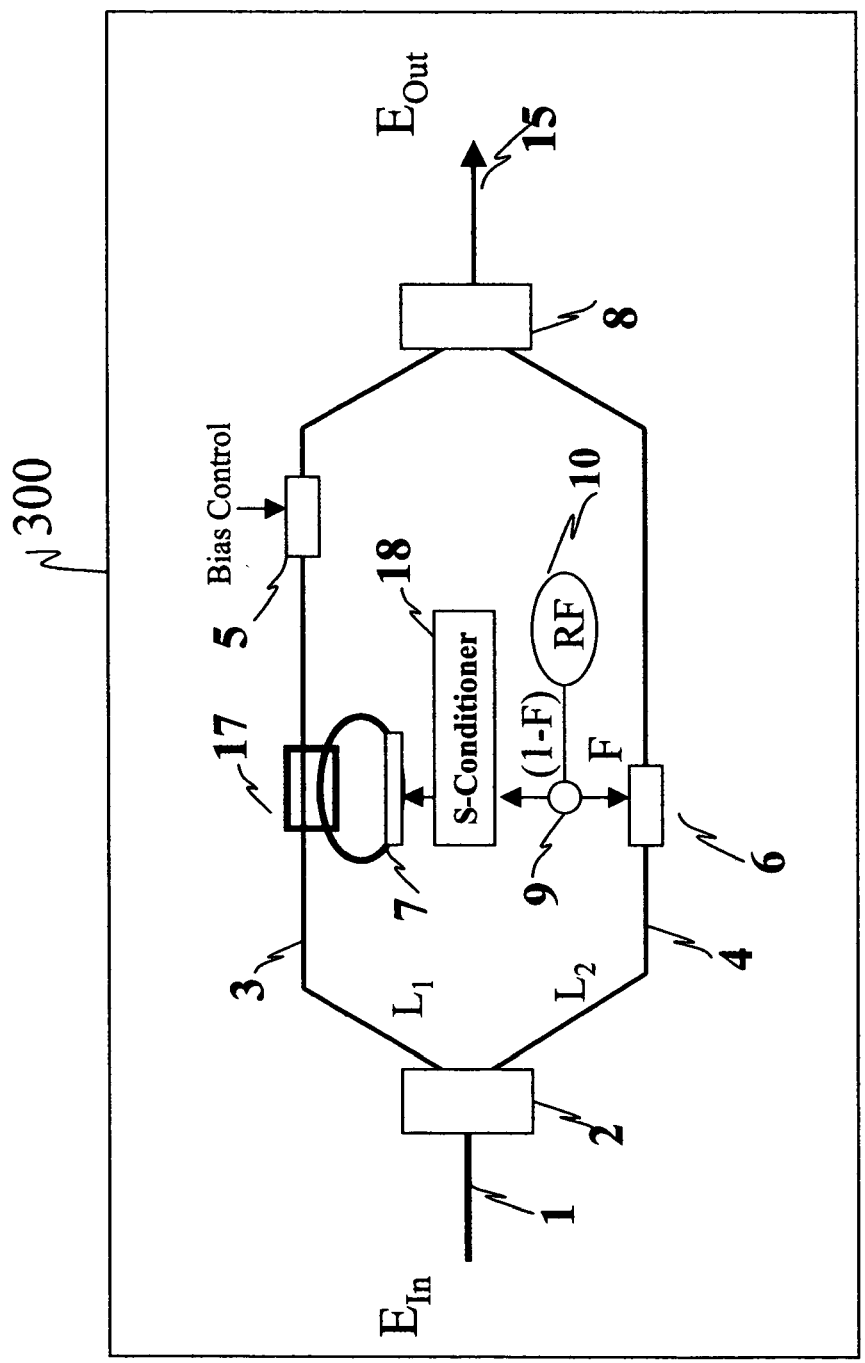
FIG. 9 Functional schematic of another embodiment of ultra-high linearity external modulator consisting of a modified MZI having two arms with one phase modulator (PM) and one ring resonator (RR) are coupled to different arms of the MZI (parallel PM-RR MZI for short).

FIG. 9 depicts the third embodiment 300 of present invention using a modified Mach-Zehnder interferometer (MZI) configuration. It is basically similar to FIG. 1 except for two minor changes. First, the PM 6 and RR 7 are now located and coupled in each of the arms of the interferometer. Second, the sign of the RF input power signal injected into the electrode (not shown) of the RR 7 is opposite compared with the sign of the RF input power signal injected onto PM 6. This is functionally accomplished by a signal conditioning mean 18 or by the initial phase setting in RR 7. The corresponding output intensity is then given as $$I_{out} = |E_{out}|^2 = \frac{(E_0)^2}{2}(1 + \mathrm{Sin}(K\eta d_{pm} - \Theta(\delta, 2d_{pm}))) \quad \text{Eq. 4}$$

Just like FIG. 1, it is operated at an inflection point where the second-order intermodulation distortion is zero. All superior characteristics found in the first 100 and second 200 embodiments will also be obtained in this third embodiment 300. Detailed discussion will not be given here since Eq. 4 is functionally the same with Eq. 3 provided the sign of the RF signal injected to RR 7 is opposite.

Figure 10:
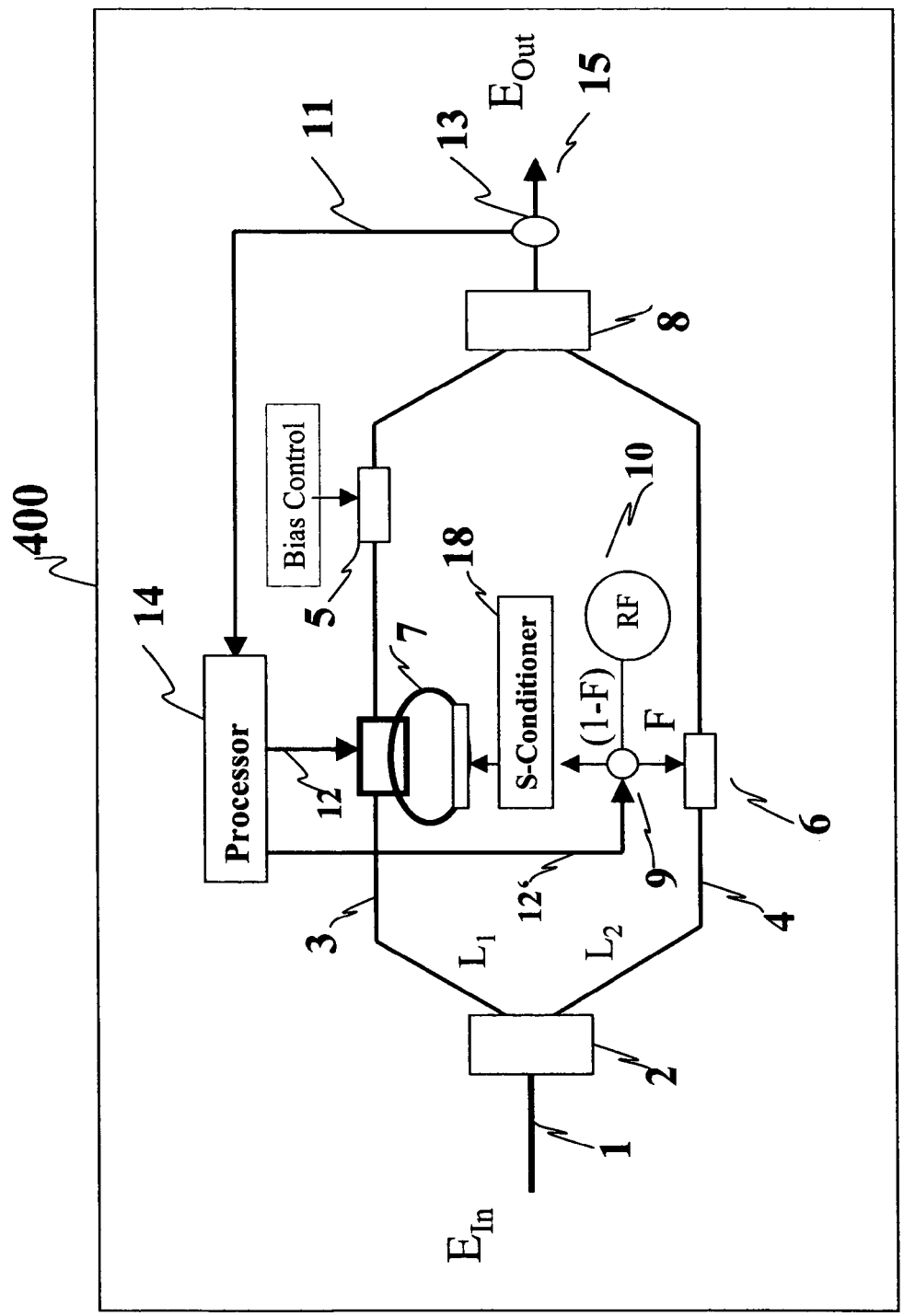
FIG. 10 Parallel PM-RR-MZI modulator with very simple but powerful and adaptive compensation scheme.

FIG. 10 depicts the fourth embodiment 400 of present invention using the third embodiment 300 with an adaptive compensation scheme. It is basically similar to FIG. 9 except for that a portion of the output signal 15 is tapped by an optical tap 13 as feedback signal (FS) 11, and used as input to a processor module 14. Then the module 14 generates the required electrical output signal 12 and 12' to control parameters γ and F. The basic idea of the compensation scheme is similar to that described for FIG. 6 and will not be discussed here in detailed.

Figure 11:
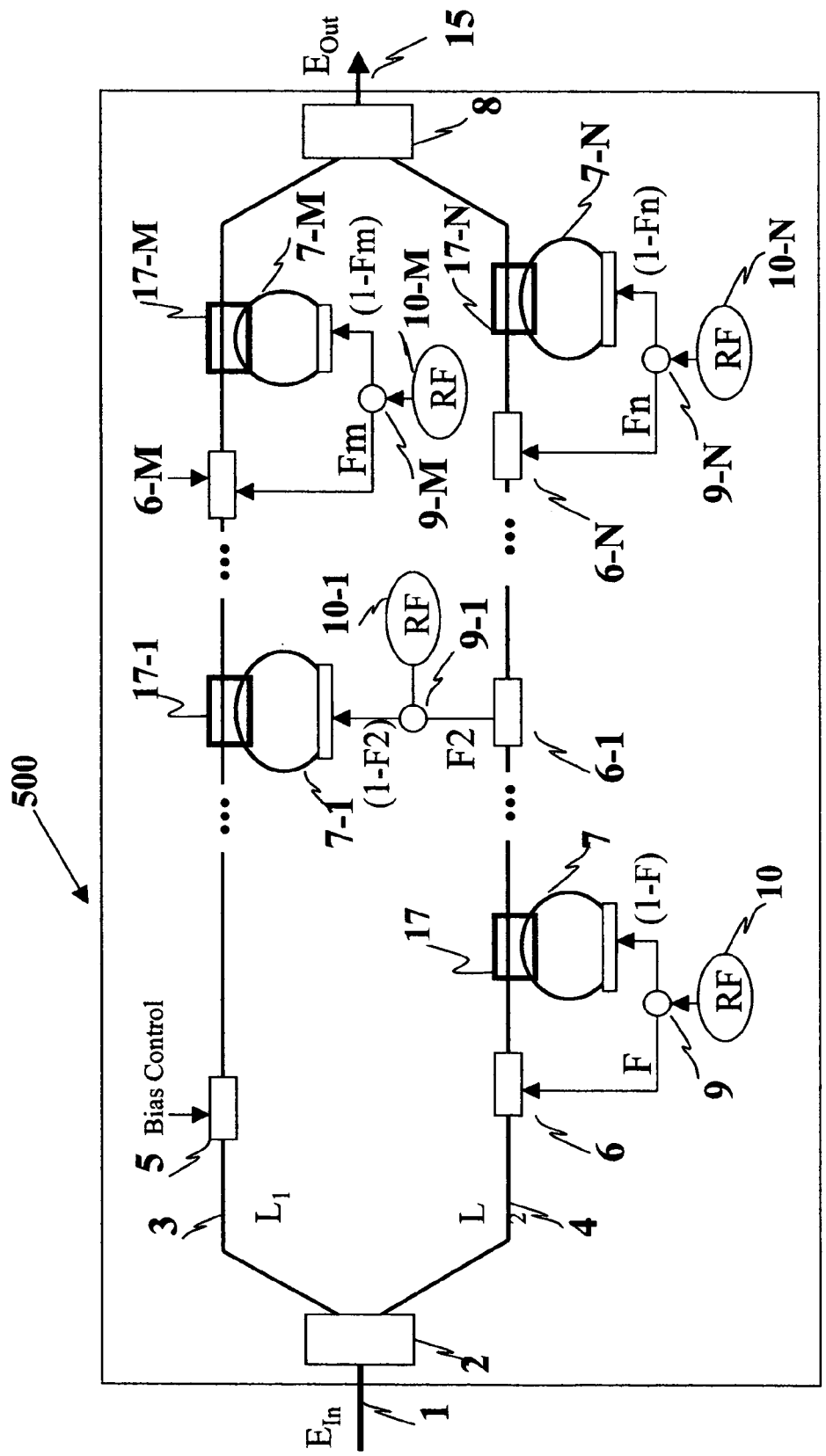
FIG. 11 Functional schematic of another embodiment of ultra-high linearity external modulator consisting of a modified MZI having two arms where more than one phase modulator (PM) and more than one ring resonator (RR) are coupled to different arms of the MZI.

FIG. 11 depicts the fifth embodiment 500 of present invention. It is fundamentally the same with the first 100 and third 300 embodiments except that the arms of PM-RR MZI modulator 500 contains more than one pair of PM (6, 6-1, . . . , 6-M, 6-N) and RR (7, 7-1, 7-2, . . . , 7-N) which are arranged either in series or parallel arrangements. The arm difference of MZI is set to operate at an inflection point. Furthermore, the power slit ratio (F, F1, . . . , Fm, Fn:1-F, 1-F1, . . . , 1-Fm, 1-Fn) of the respective RF power splitters (9, 9-1, . . . , 9-M, 9-N) and the signs of each RF power signals (10, 10-1, . . . , 10-M, 10-N) are set accordingly. The RF power signals (10, 10-1, . . . , 10-M, 10-N) may come from a single main RF source or separate independent RF sources. The advantages of this arrangement are increase design flexibility, greater control of parameter tolerance and higher SFDR.

Figure 12:
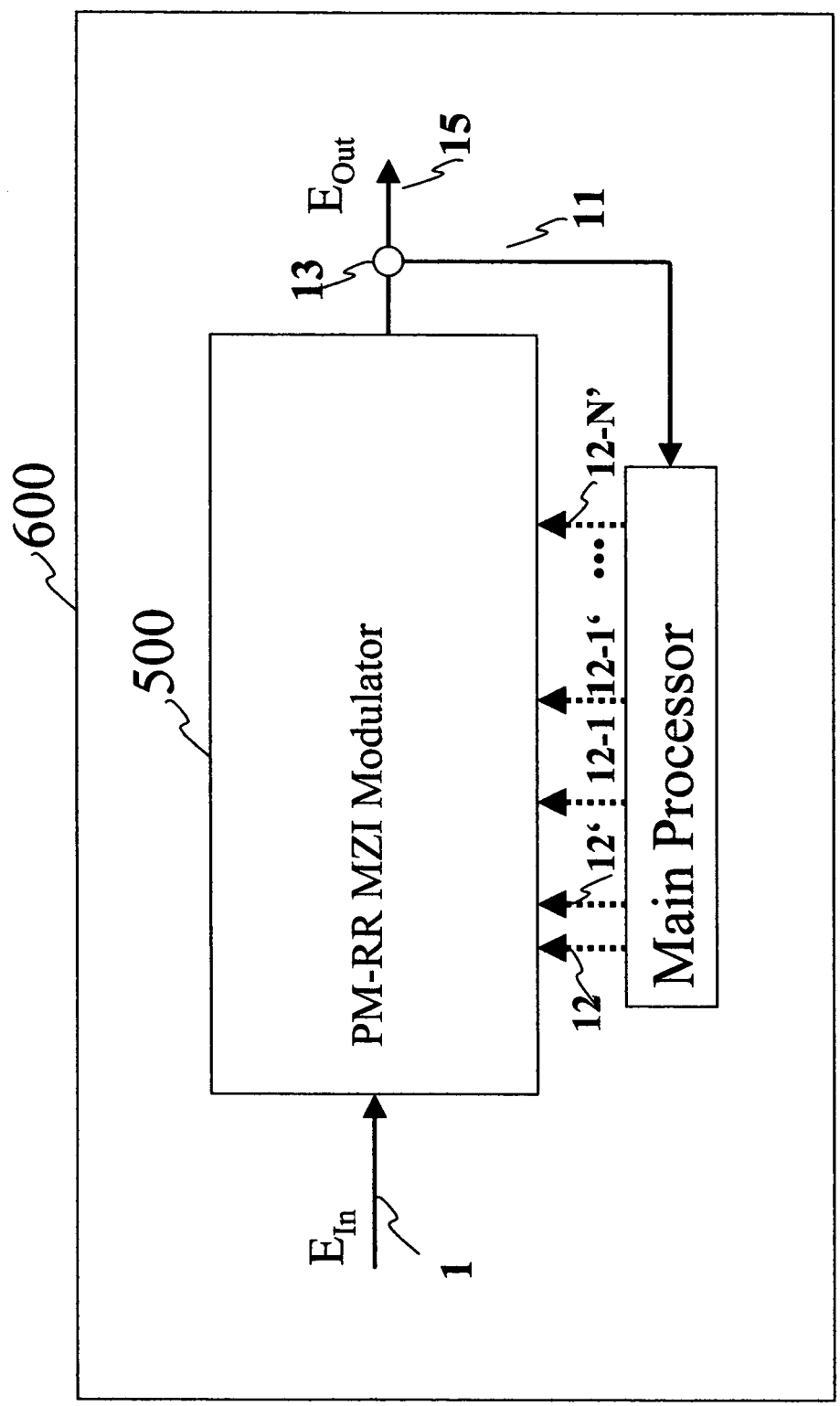
FIG. 12 Parallel PM-RR-MZI modulator with multiple PM and RR together with very simple but powerful and adaptive compensation scheme.

FIG. 12 depicts the sixth embodiment 600 of present invention which is basically the fifth embodiment 500 with an adaptive compensation scheme. It is basically similar to FIG. 11 except that a portion of the output signal 15 is tapped by an optical tap 13 as a feedback signal (FS) 11, and used as input to a processor module 14. Then the module 14 generates the required electrical output signals 12, 12-1, . . . , 12-N, for each of the ring resonators to adjust the respective coupler coefficients 17, 17-1, . . . , 17-N, and electrical output signals 12', 12-1', . . . 12-N' for RF power splitters 9, 9-1, . . . , 9-N to control their respective splitting ratio values. The basic idea of the compensation scheme is similar to that described in FIGS. 6 and 10.

Figure 13:
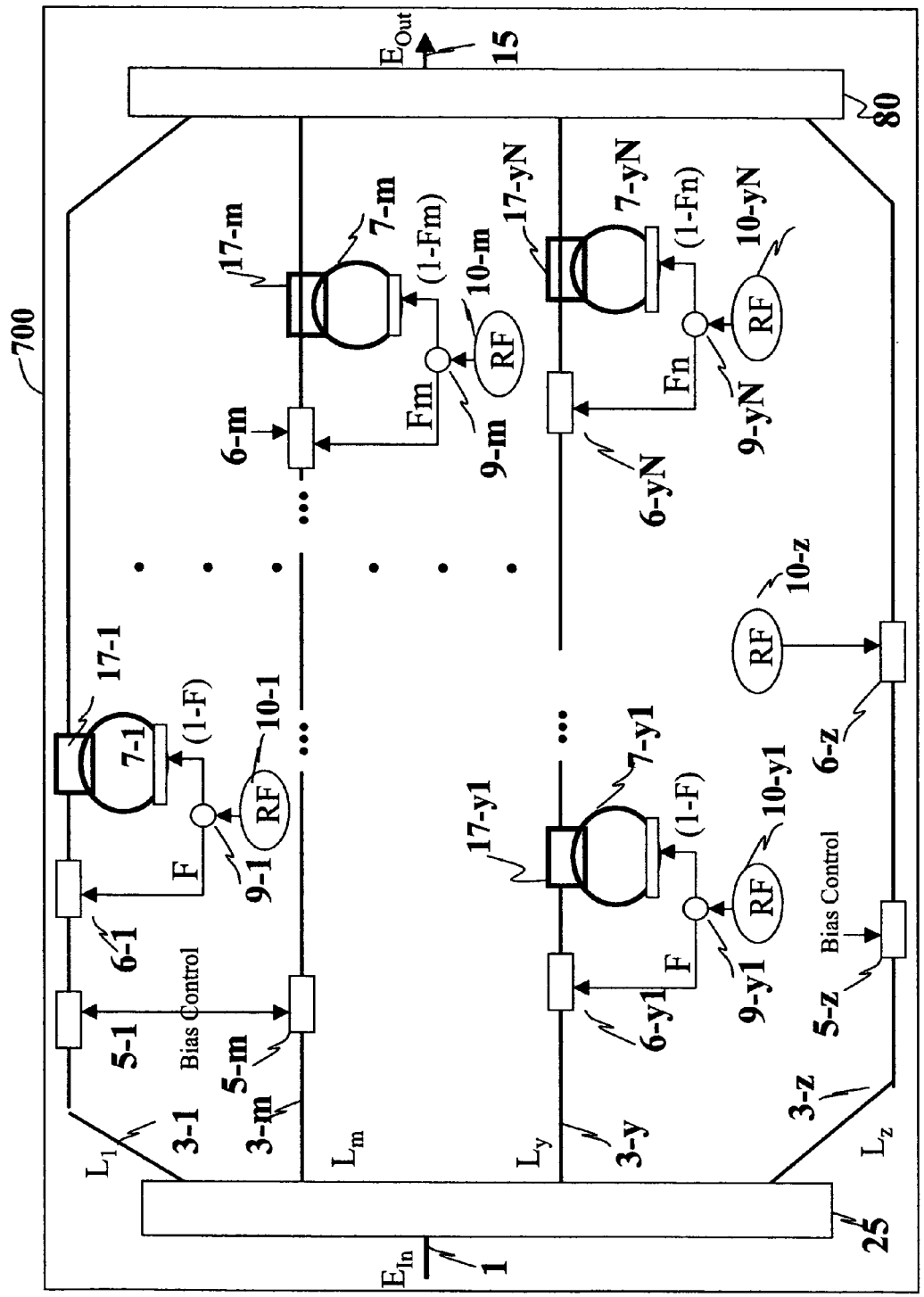
FIG. 13 Functional schematic of another embodiment of a generalized ultra-linear external modulator (generalized PM-RR-MZI modulator) consisting of a modified MZI with more than two arms having at least one pair of phase modulator (PM) and ring resonator (RR) which are coupled onto same or different arms of the MZI.

FIG. 13 depicts the seventh embodiment 700 of present invention. It is fundamentally the same with the sixth embodiment except that the PM-RR MZI modulator 700 has more than two arms. It can be called a generalized PM-RR-MZI modulator. Each of the arms (L1, . . . Lz) can be considered as a phase modulating banks and may contain modulator or modulators selected from group consisting of PM only, RR only, cascade of PM, cascade of RR, pair of PM and RR, and cascade of PM and RR. They could be positioned either in series or parallel arrangements among the different arms of the generalized Mach-Zehnder interferometer. The power slit ratio (F, F1, . . . , Fm, Fn:1-F, 1-F1, . . . , 1-Fm, 1-Fn) of the respective RF power splitters (9, 9-1, . . . , 9-M, 9-N) and the signs of each RF power signals (10, 10-1, . . . , 10-M, 10-N) are set accordingly. The RF power signals (10, 10-1, . . . , 10-M, 10-N) may come from a single main RF source or separate independent RF sources. The advantages of this arrangement are increase design flexibility, greater control of parameter tolerance and higher SFDR.

Figure 14:
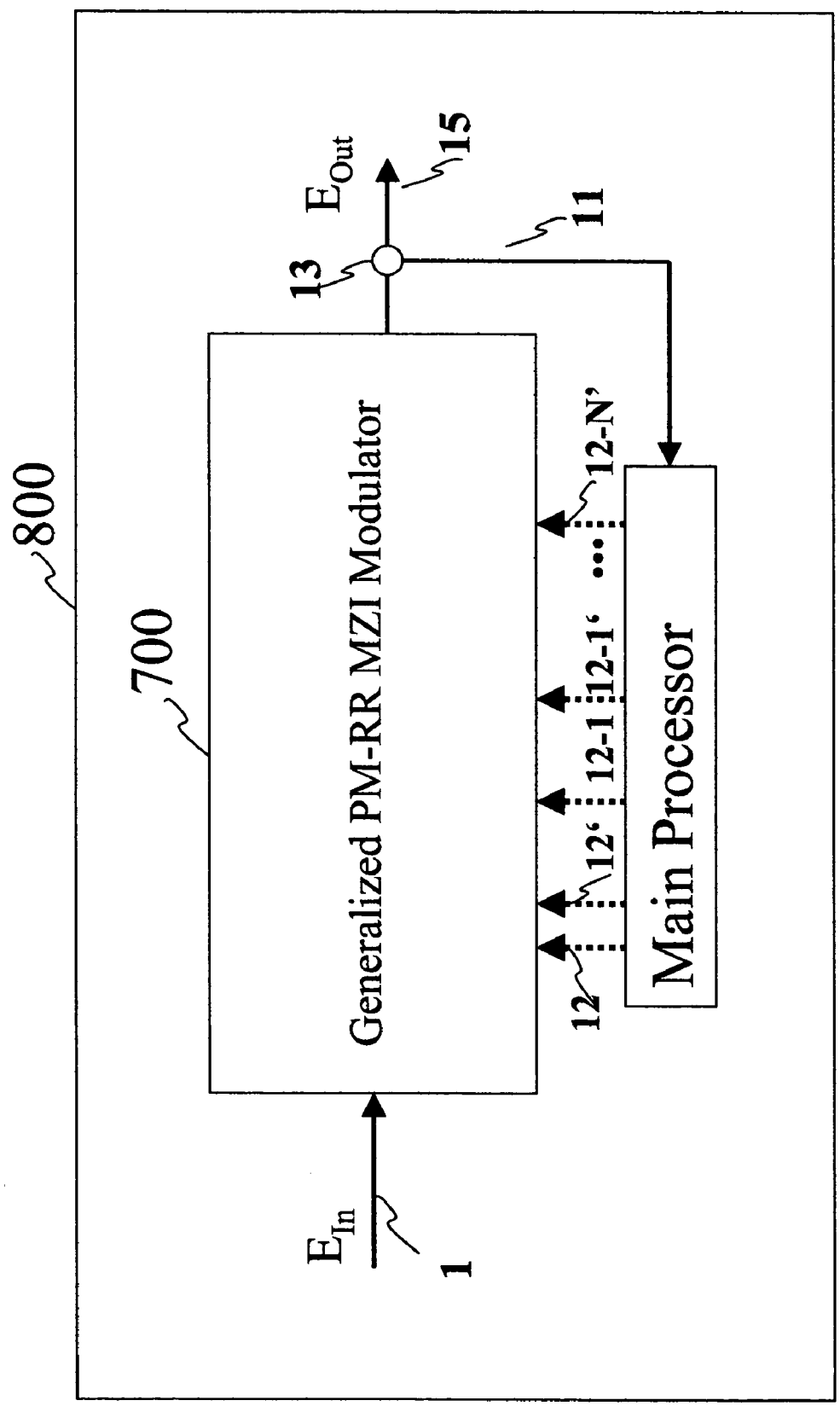
FIG. 14 Generalized PM-RR-MZI modulator with very simple but powerful and adaptive compensation scheme.

FIG. 14 depicts the eighth embodiment 800 of present invention which is the seventh embodiment 700 with an adaptive compensation scheme. It is basically similar to FIG. 13 except for that a portion of the output signal 15 is tapped by an optical tap 13 as a feedback signal (FS) 11, and used as input to a processor module 14. Then the module 14 generates the required electrical output signals 12, 12-1, . . . , 12-N, for each of the ring resonators to adjust the respective coupler coefficients 17, 17-1, . . . , 17-N, and electrical output signals 12', 12-1', . . . , 12-N' for RF power splitters 9, 9-1, . . . , 9-N to control their respective splitting ratio values. The basic idea of the compensation scheme is similar to that described in FIGS. 6, 10 and 12.

FIG. 15 to FIG. 25—Additional Embodiments

Figure 15:
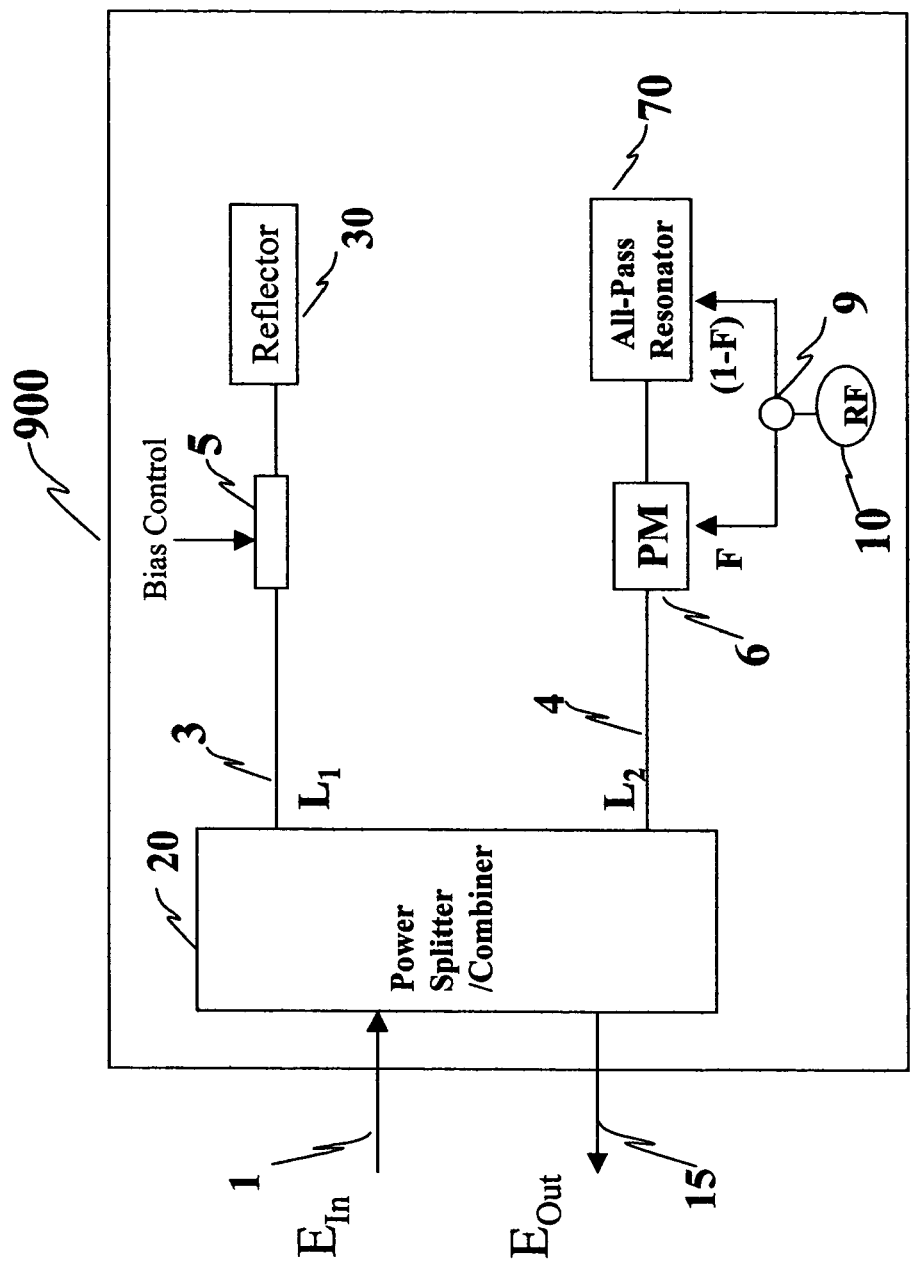
FIG. 15 Functional schematic of another embodiment of ultra-linear external modulator in a reflective mode (serial PM-APR/M MI modulator) using a modified Michelson interferometer (MI) with phase modulator (PM) and all-pass-resonator/modulator (APR/M).

FIG. 15 depicts the functional diagram of the second generic embodiment 900 of the present invention. In this embodiment, the configuration based on Michelson interferometer (MI) is used instead of MZI as found in previous embodiments. It is functionally the same with FIG. 1 except it is operated in reflection mode. The modified MI comprises of an optical input signal 1, 2×2 optical power separating/combining means 20, phase modulator (PM) 6, all-pass resonator/modulator (APR/M) 70, bias controller 5, reflector 30, RF power splitter 9, RF power source 10, and optical output signal 15. The optical power separating/combining means 20 might has uneven splitting power ratio as well as variable or adjustable power ratio. It may take the form of, but not limited to optical circulator coupled to a 1×2 Y-junction splitter, 2×2 directional coupler (DC), or any waveguide polarization beam splitter or beam combiner. The interferometer may take the form of a non-polarized MI or polarized MI.

Figure 16:
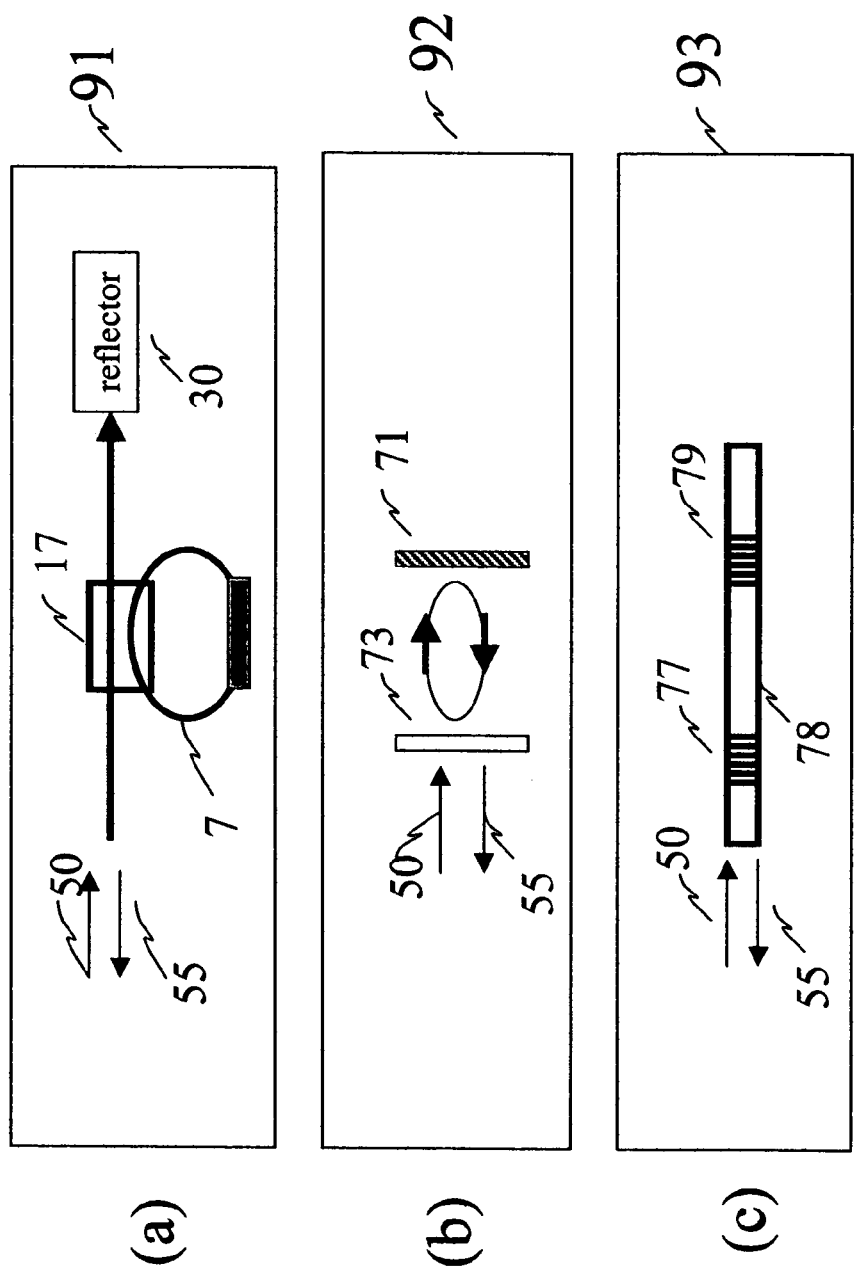
FIG. 16 Schematic diagram of three forms of all-pass-resonator/modulator (APR/M) namely; waveguide-based ring resonator (a), bulk optics-based Gires-Tournois resonator (GTR) (b), and fiber-bragg grating (FBG)-based GTR.

As shown in FIG. 16, the APR/M 70 may take three, but not limited, to the following different forms namely; (i) block 91, block 92, and (iii) block 93. Block 91 comprises of ring resonator (RR) 7 having a coupler's coefficient 17 and with reflector 30 coupled at the output port. An input signal 50 enters and propagates through block 91 and then exists at the output port of RR 7. Because of the reflector 30, the signal is fed back to the RR 7 to propagate the second time and exit as output signal 55.

Block 92 comprises of bulk optics-based Gires-Tournois resonator (GTR) having a nearly totally reflective (~100%) back mirror 71 and front mirror back 73. Any incoming signal 50 incident onto GTR is reflected back as output signal 55 after the signal undergoes multiple-reflection inside the cavity. The third block 93 comprises of Fiber Bragg Grating (FBG) 78 having a front waveguide grating 77 and a back waveguide grating 79 that forms a resonator structure to return back any input signal 50 incident onto FBG, at specified wavelength, as output signal 55. Other implementations of APR/M 70 might take the form of a photonic bandgap (PBG)-based ring resonator and micro-ball-based ring resonator (not shown).

Figure 17:
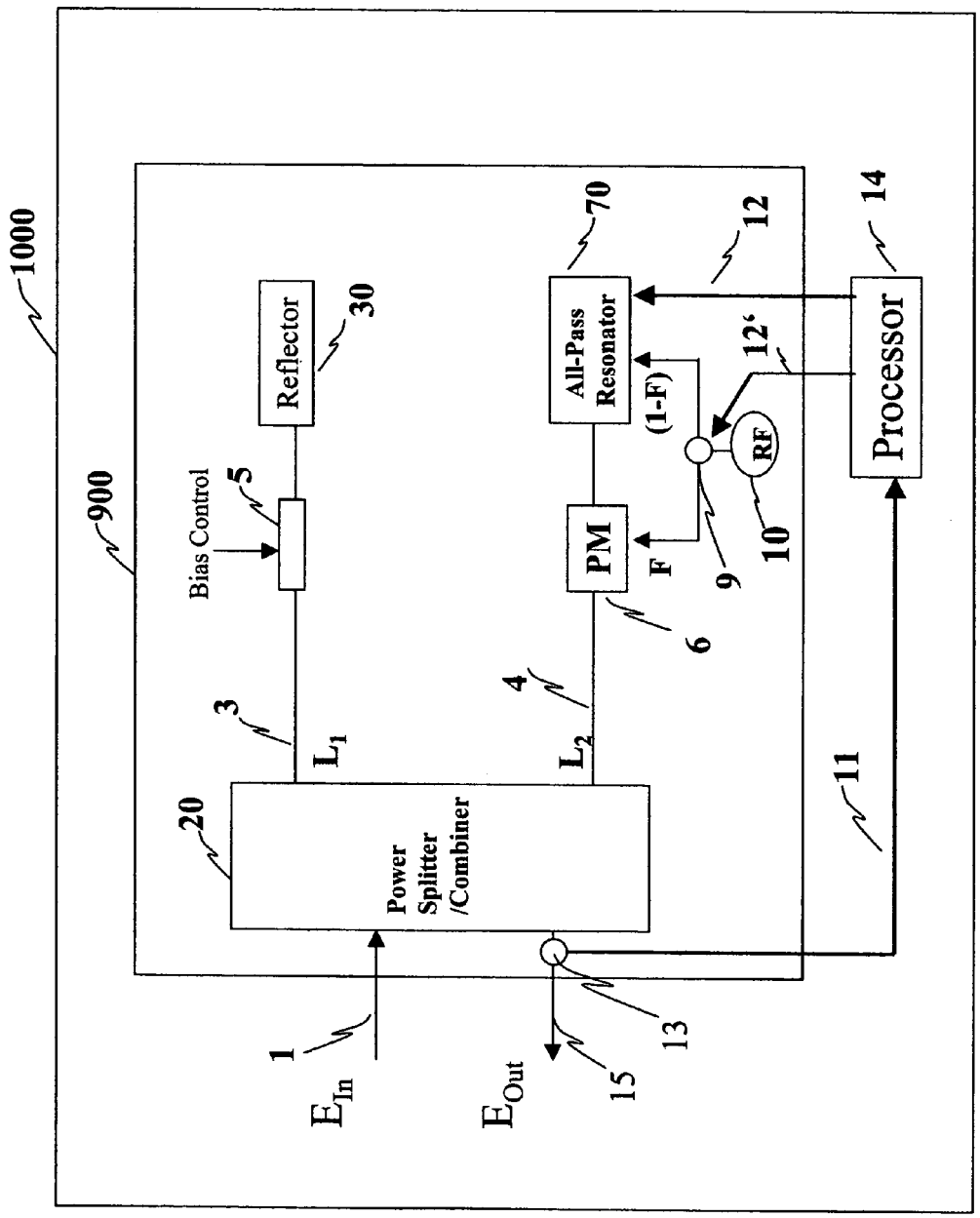
FIG. 17 PM-APR/M MI modulator with very simple but powerful and adaptive compensation scheme.

The basic operation and mathematic are similar to the case of modified MZI modulator as described previously except that the main output signal 15 exits at one of the input port of optical power separating/combining means 20. As seen in FIG. 17, the PM 6 and all-pass resonator/modulator (APR/M) 70 are connected in series and coupled to one arm of the interferometer. Both are driven by the same RF power source 10 whose output power is split by a RF power dividing means 9 with a ratio of (F:1-F) before they are fed to the respective electrodes (not shown) of PM 6 and APR/M 70. The other arm of the interferometer is coupled to a reflector 30 so as to reflect back the signal toward the optical separating/combiner means 20. Since the operation is straightforward, it will not be discussed in further detailed.

As a brief summary of the operation, the optical signal 1 is split by an optical power separating/combiner means 20 into two (or more) portions. It might have variable or uneven splitting power ratio between the different output ports. These two input signals propagate into the arms of the interferometer denoted by $L_1$, 3, and $L_2$, 4. A reflector 30 is attached to the path $L_1$ at the end of the arm to reflect back the signal. On the other arm, $L_4$, the other input signal propagates through the series PM 6 plus APR/M 70 to gain some linear and non-linear phase-correction before it is reflected back toward the optical power separating/combiner means 20. The two reflected signals are coherently combined and the effective output signal exits at the other input port of the optical power separating/combiner means 20. A bias control means 5 controls the path length difference between the arms of the interferometer.

FIG. 17 depicts the tenth embodiment 1000 of present invention where the previous embodiment 900 is provided with an adaptive compensation scheme. It is basically similar to FIG. 15 except that a portion of the output signal 15 is tapped by optical tap 13 as a feedback signal 11, FS and used as input to a processor module 14. Then the module 14 generates the required electrical output signal 12 and 12' to control parameters γ and F. The basic idea of the compensation scheme is similar to that described previously.

Figure 18:
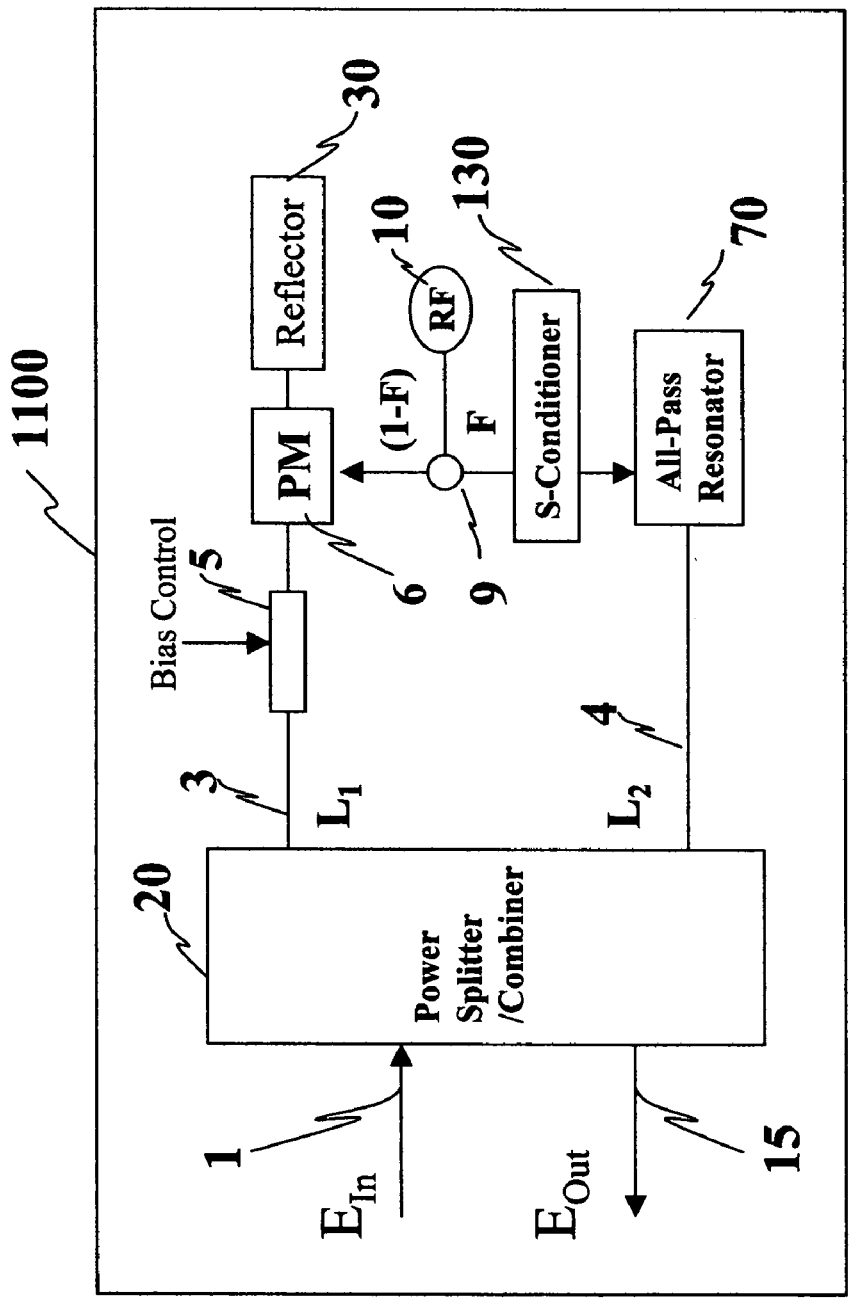
FIG. 18: Functional schematic of another embodiment of ultra-linear external modulator consisting of a modified MZI where the phase modulator (PM) and APR/M are coupled to different arms of the MI (parallel PM-APR/M MI modulator for short).

FIG. 18 depicts the eleventh embodiment 1100 of present invention using a modified Michelson interferometer (MI). It is basically similar to FIG. 15 except for two minor changes. First, the PM 6 and APR/M 70 are now located in each of the arms of the MI. Second, the sign of the portion of the RF power 10 injected into the electrode (not shown) of the APR/M 70 is opposite compared with the sign of the RF power injected onto electrode (not shown) of PM 6. This is functionally accomplished by module RF signal conditioning means 130. Just like FIG. 10, it is operated at an inflection point when second-order intermodulation distortion is minimum or zero.

As seen in FIG. 18, the optical signal 1 is split by an optical power separating/combiner means 20 into two portions. The first input signal propagates through one arm where the PM 6 is coupled and terminated by a reflector 30. The signal is then reflected back toward the optical separating/combiner means 20 to pass the second times. In the same manner, the other input signal is propagates through APR/M 70 and reflected back toward optical separating/combiner means 20. The two reflected signals are coherently combined and the effective output signal exits at the other input port of the optical power separating/combiner means 20. All superior characteristics found in the previous embodiments will also be obtained in this embodiment.

Figure 19:
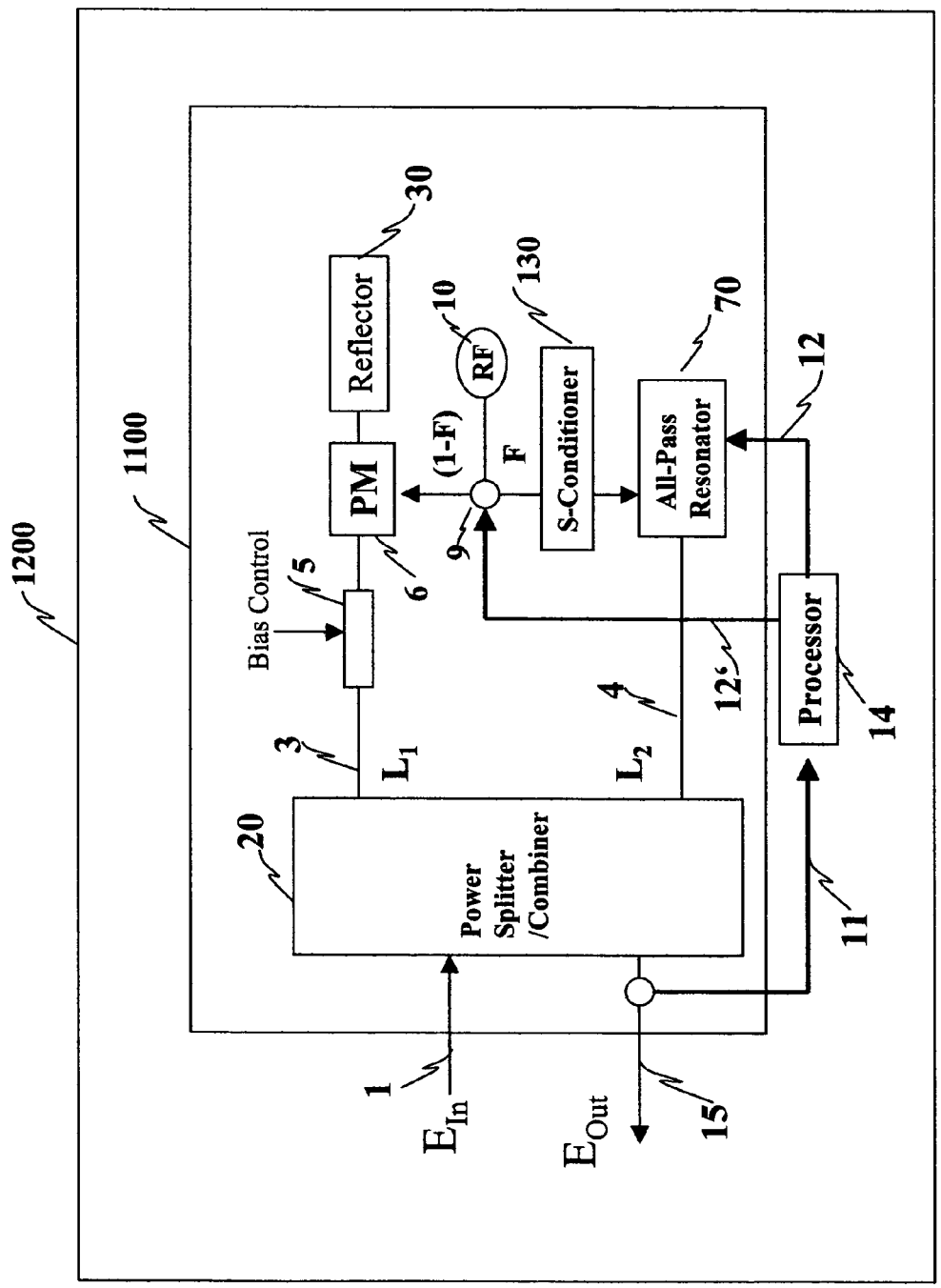
FIG. 19 Parallel PM-APR/M MI modulator with very simple but powerful and adaptive compensation scheme.

FIG. 19 depicts the twelfth embodiment 1200 of present invention where adaptive compensation scheme is added to embodiment 1100. The basic idea of the compensation scheme is similar to that described for FIG. 17.

Figure 20:
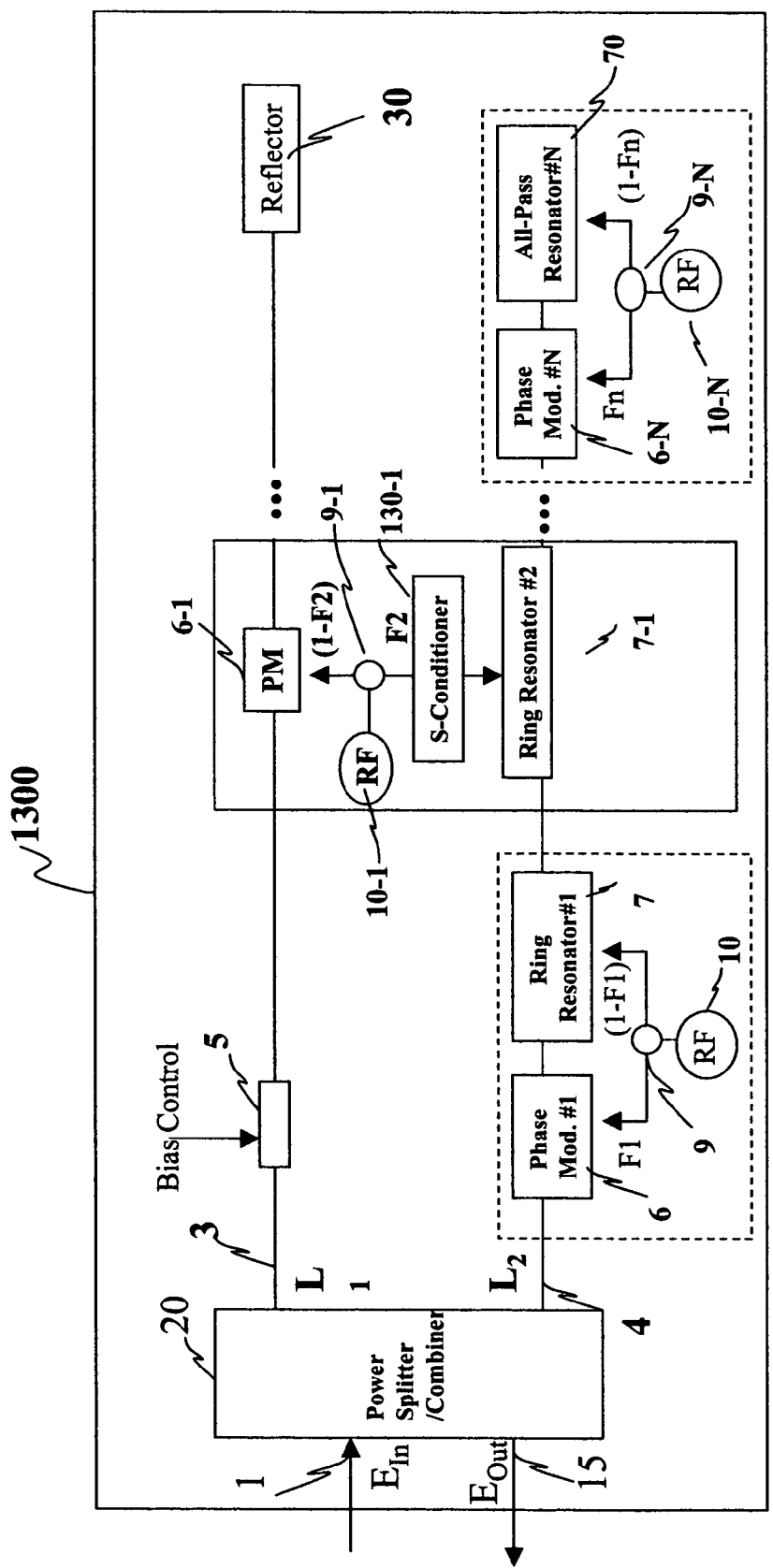
FIG. 20 Functional schematic of another embodiment of a generalized ultra-linear external modulator consisting of a modified MI with more than one pair of phase modulator (PM) and APR/M which are coupled onto same or different arms of the MZI.

FIG. 20 depicts the thirteenth embodiment of present invention using a generalized PM-APR/M MI modulator 1300 where the arms of the MI contains more than one pair of PM (6, 6-1, . . . , 6-N), RR (7, 7-1, 7-2, . . . , 7-N) with the last APR/M 70 positioned at the end of the cascade. The RR (7, 7-1, 7-2, . . . , 7-N) and PM (6, 6-1, . . . , 6-N) could be arranged either in series or parallel arrangements. The arm difference of MI is set to operate at an inflection point by the bias control means 5. The basic operation and the mathematics are similar to the case of generalized PM-RR MZI modulator as described previously except that the main output signal 15 exits at one of the input port of optical power separating/combining means 20.

As seen in FIG. 20, the optical signal 1 is split by an optical power separating/combiner means 20 into two input signals. The first input signal propagates through one arm where there is at least one PM 6 coupled to the arm and terminated by a reflector 30. A RR 7 can also be coupled in this arm. The signal is then reflected back toward the optical separating/combiner means 20. In the same manner, the second input signal propagates through a series of PM (6, 6-1, . . . , 6-N), RR (7, 7-1, 7-2, . . . , 7-N) and APR/M 70. The APR/M 70 is positioned at the end of the cascade to reflect back the signal toward optical separating/combiner means 20. Then, the two reflected signals are coherently combined and the effective output signal exits at the other input port of the optical power separating/combiner means 20. The power slit ratio (F, F1, . . . , Fn:1-F, 1-F1, . . . , 1-Fn) of the respective RF power splitters (9, 9-1, . . . , 9-N) and the signs of each RF power signals (10, 10-1, . . . , 10-N) are also set accordingly. The RF power signals may come from a single main RF source or separate independent RF sources.

Figure 21:
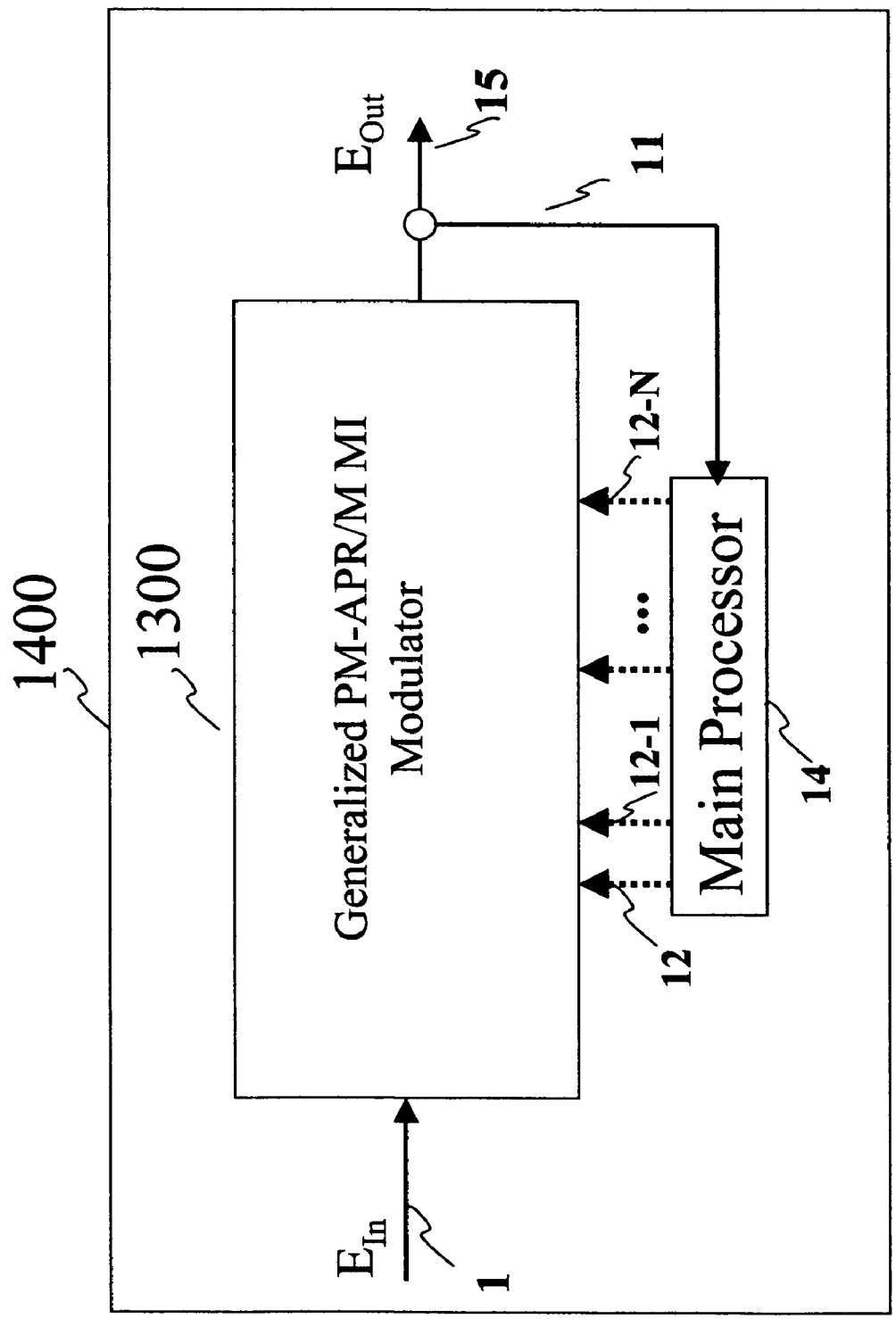
FIG. 21 Generalized PM-APR/M MI modulator with very simple but powerful and adaptive compensation scheme.

FIG. 21 depicts the fourteenth embodiment 1400 of present invention where embodiment 1300 is provided with an adaptive compensation scheme. The basic idea of the compensation scheme is similar to that described for FIG. 12. The advantage of this arrangement is more design flexibility, greater control of parameter tolerance and higher SFDR.

Figure 22:
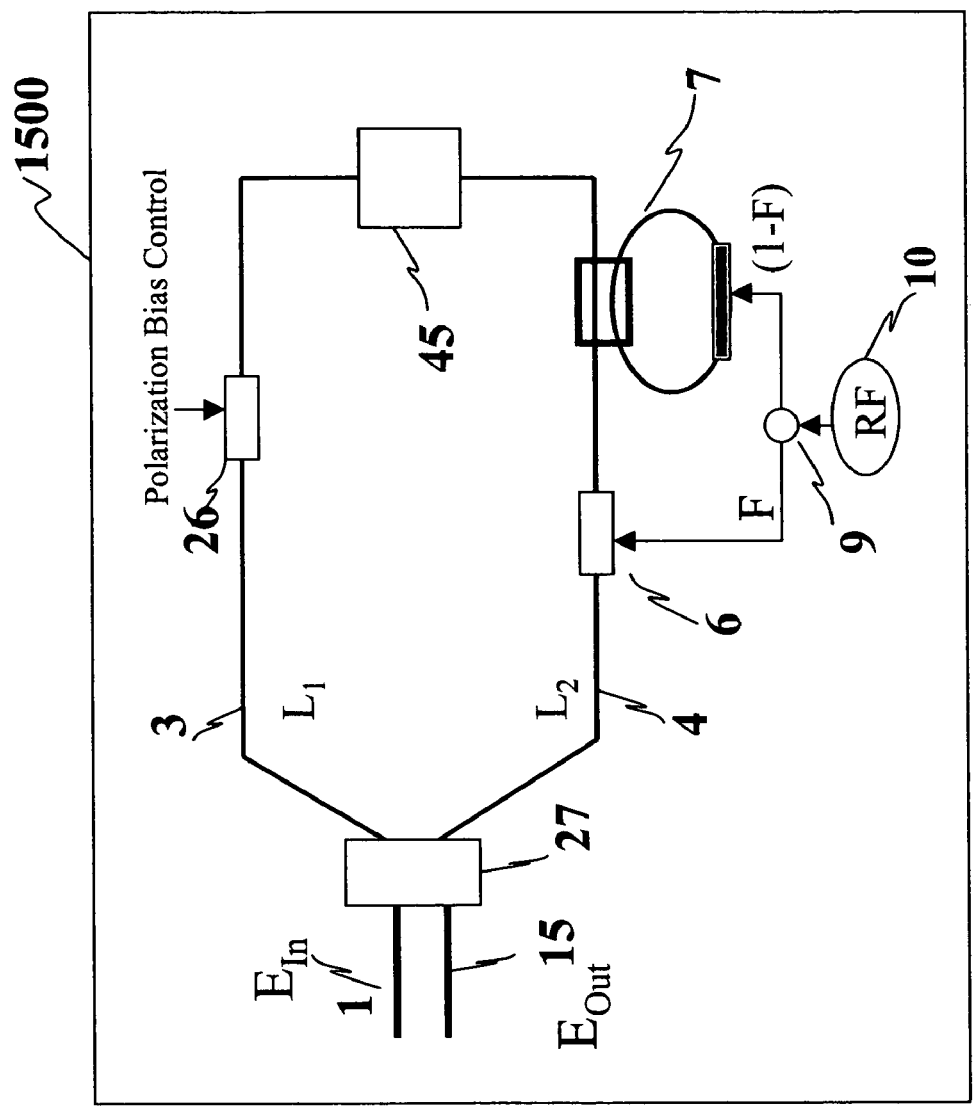
FIG. 22 Functional schematic of third generic embodiment of a generalized ultra-high linearity external modulator consisting of a modified Sagnac interferometer (PM-RR-SI) one pair of PM and RR which are coupled onto loop arm of the interferometer.

FIG. 22 depicts the functional diagram of the third generic embodiment 1500 of the present invention. In this embodiment, the configuration is based on Sagnac interferometer (SI). The modified SI comprises of an optical input signal 1, 2×2 polarization-based optical power separating/combining means 27, phase modulator (PM) 6, ring resonator/modulator (RR) 70, polarization bias control means 26, 45-degree rotator means 45, RF power splitter 9, RF power source 10, and optical output signal 15. The two arms of the SI are interconnected to produce a loop. The arm difference between the two polarized beams propagating along the loop of SI is set at an inflection point by the choice of waveguide material, use of polarization bias control means 26 and proper placement of the 45-degree rotator means 45 within the loop. The polarization-based optical power separating/combining means 27 might have uneven splitting power ratio as well as variable or adjustable power ratio. It may take the form of, but not limited to optical circulator coupled to a 1×2 polarization beam splitter, 2×2 polarization-based directional coupler (DC), or any waveguide polarization beam splitter or beam combiner.

As seen in FIG. 22, the optical signal 1 injected in the first input port of the 2×2 polarization-based separating/combiner means 27 is split into two polarized input signals. These two input signals propagate along the loop where there is at least one PM 6 and one RR 7 coupled to the loop. These two signals are depolarized as they travel through 45-degree rotator means 45, then combined at the separating/combiner means 27 and exit at second input port of separating/combiner means 27. The power slit ratio (F:1-F) of the respective RF power splitter 9 and the signs of each RF power signals 10 are also set accordingly.

Figure 23:
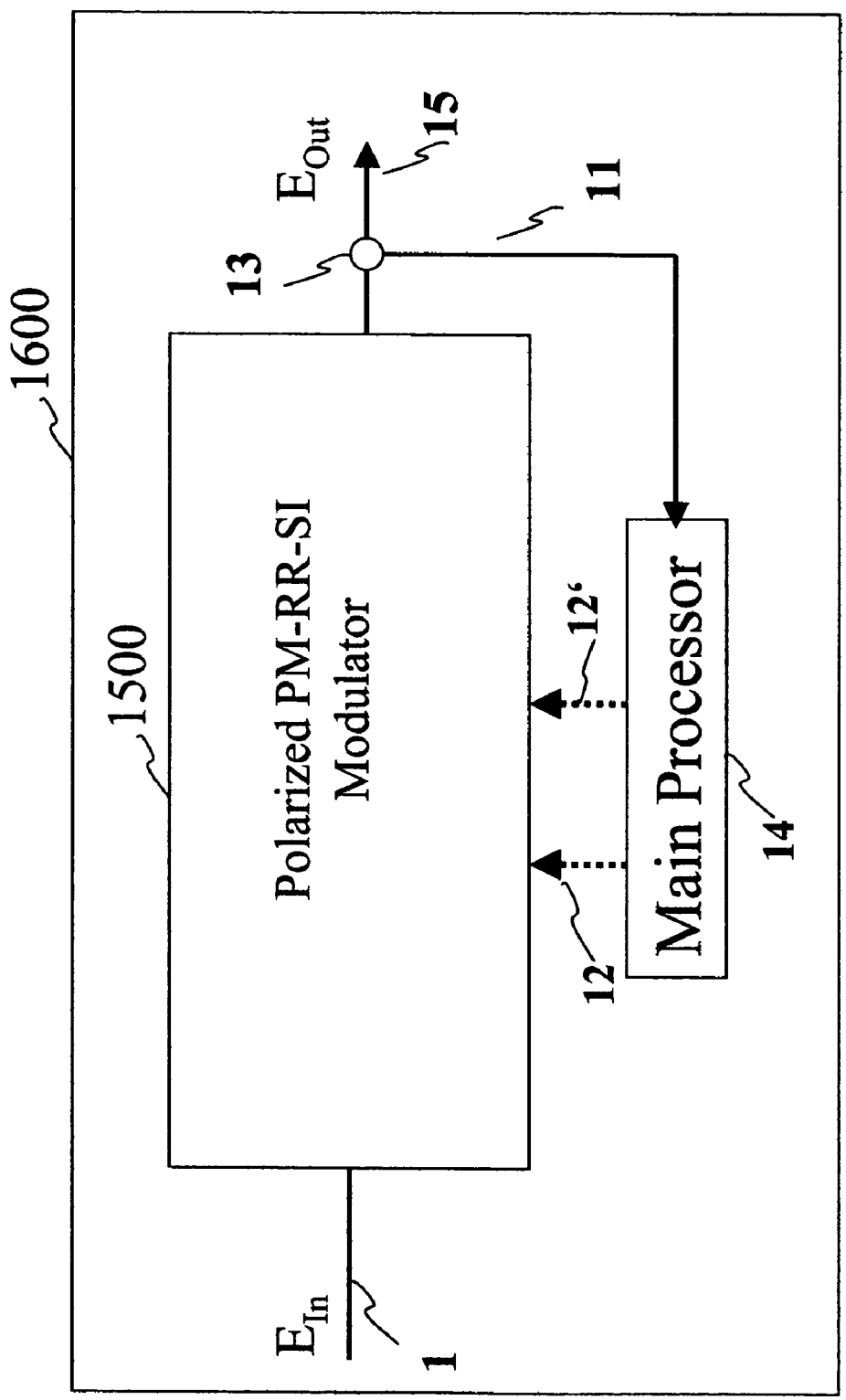
FIG. 23 PM-RR-SI modulator with very simple butt powerful and adaptive compensation scheme.

FIG. 23 depicts the fifteenth embodiment 1600 of present invention where embodiment 1500 is provided with an adaptive compensation scheme. The basic idea of the compensation scheme is similar to that described for FIG. 12. The advantage of this arrangement is more design flexibility, greater control of parameter tolerance and higher SFDR.

Figure 24:
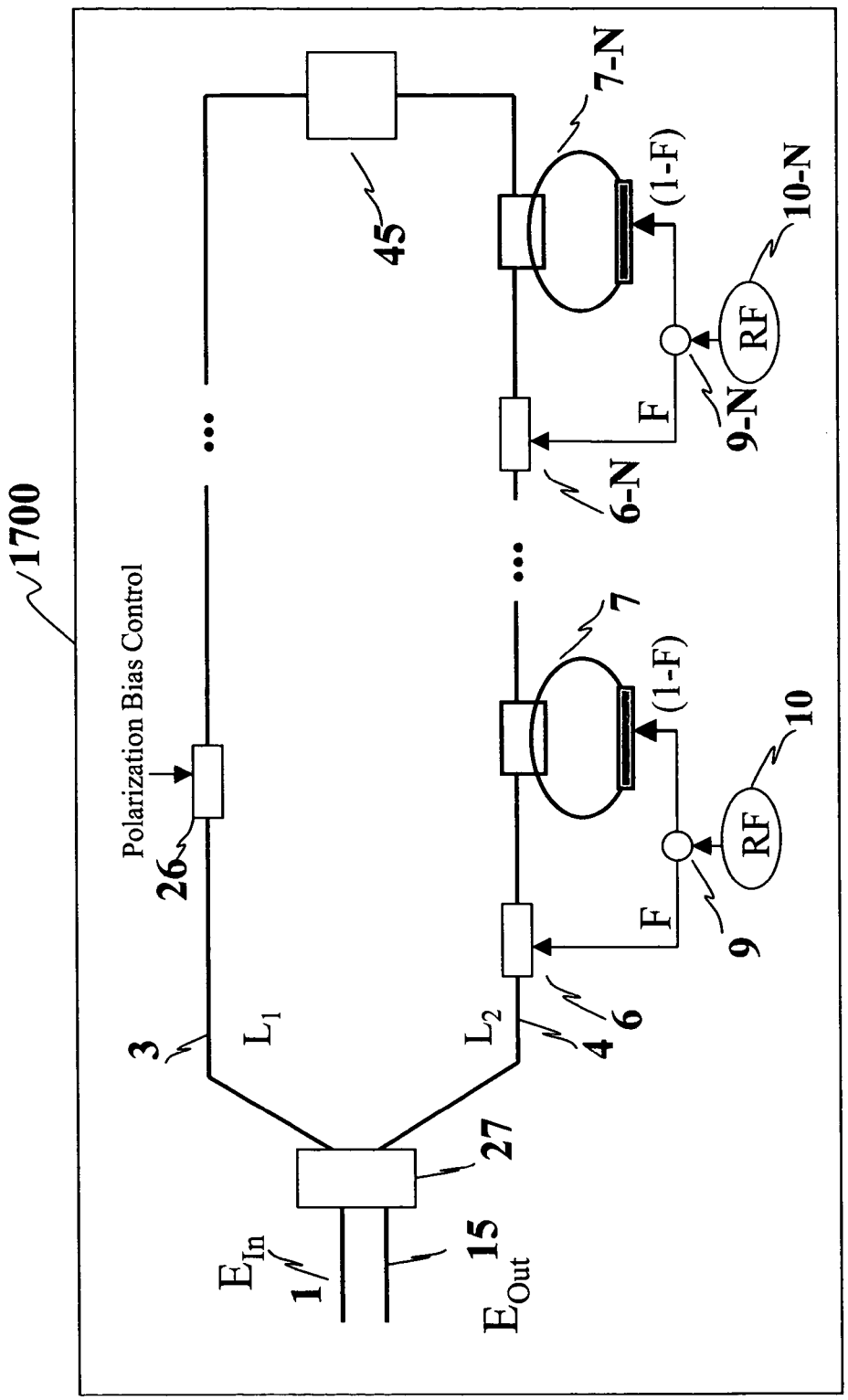
FIG. 24 Functional schematic of a generalized PM-RR-SI modulator where the modified Sagnac interferometer has more than one pair of PM and RR which are coupled onto loop arm of the interferometer.

FIG. 24 depicts the sixteenth embodiment of present invention using a generalized PM-RR SI modulator 1700 where the loop of the SI contains more than one pair of PM (6, 6-1, . . . , 6-N), and RR (7, 7-1, 7-2, . . . , 7-N). The two polarization signals that traversed the loop are combined at the optical separating/combiner means 27 and exit at the second input port of the combiner means 27. The power slit ratio (F, F1, . . . , Fn:1-F, 1-F1, . . . , 1-Fn) of the respective RF power splitters (9, 9-1, . . . , 9-N) and the signs of each RF power signals (10, 10-1, . . . , 10-N) are also set accordingly. The RF power signals may come from a single main RF source or separate independent RF sources. The arm difference between the two polarized beams propagating along the loop of SI is set at an inflection point by the choice of waveguide material, use of polarization bias control means 26 and proper placement of the 45-degree rotator means 45.

Figure 25:
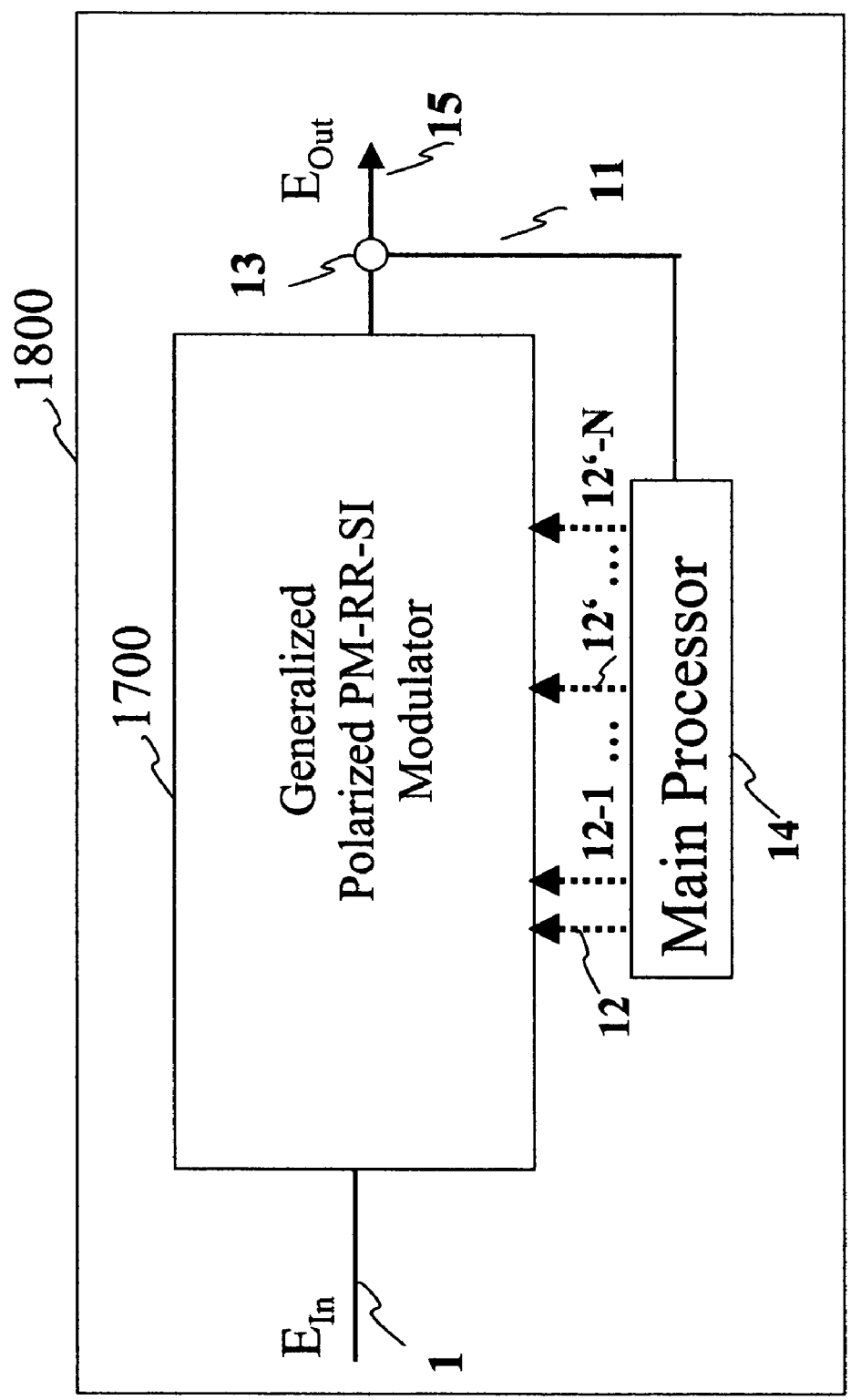
FIG. 25 Generalized PM-RR-SI modulator with very simple but powerful and adaptive compensation scheme.

FIG. 25 depicts the seventeenth embodiment 1800 of present invention where embodiment 1700 is provided with an adaptive compensation scheme. The basic idea of the compensation scheme is similar to that described for FIG. 12. The advantage of this arrangement is more design flexibility, greater control of parameter tolerance and higher SFDR.

CONCLUSION, RAMIFICATIONS, AND SCOPE

With all these configurations, the invented modulators provide an excellently very high SFDR value. It is the highest reported SFDR for any given modulator design. Furthermore, it offers other remarkable features such as high tolerance, optical insertion loss, simple arrangement, low power penalty, and low cost potential which are rarely available in most existing linearized external modulators. More importantly, the present invention modulator necessitates no complicated optical arrangement to perform dynamic compensation. All these features lead to significant leap forward in overcoming prior linearized modulator deficiencies and offer significant RF fiber optic link improvements compared with prior arts.

With all these descriptions of the invention, it will be apparent to one skilled in the art that the invention can be modified or further extended in accordance to the general principle and spirit of the present invention. The core element of the invention is the combination of the phase modulator (PM) and all-pass-resonator/modulator (APR/M) which are coupled to the interferometer arm(s). The APR/M can be implemented in many forms and not limited to ring resonator, Gires-Tournois resonator (GTR) or FBG-based GTR. Furthermore, the interferometer might take the form but not limited to MZI, MI and SI. Moreover, the implementation of the interferometer can be polarized or non-polarized.

Although the description above contains many specificities, these should not be construed as limiting the scope of the invention but as merely providing illustrations of some of the presently preferred embodiments of this invention. Various changes, substitutions, and alternations can be made herein, without departing from the principle and the scope of the invention. Accordingly, a skilled artisan can design a linearized modulator in accordance with the present invention, to best suit a given application.

TABLE 1

Parameters used in the calculation of SFDR

RF Photonic Link Parameters

| | | |
|---|---|---|
| Laser Input Power | $P_L$ | 100 mW |
| Laser Relative Intensity Noise | RIN | −165 dB/Hz |
| Total Optical Loss (end-to-end) | $L_O$ | −5.0 dB |
| Modulator Sensitivity | $V_\pi$ | 5 V |
| Modulator impedance | $R_m$ | 50 Ω |
| Detector Responsivity | $\eta D$ | 0.7 A/W |
| Detector Termination | $R_d$ | 50 Ω |
| Noise Bandwidth | BW | 1 Hz or 1 MHz |
| Combination | $P_L L_O \eta_D$ | 7 mA |

What is claimed:

1. An apparatus for linearly modulating a light signal comprising:
   a substrate of material having an electro-optic effect;
   a Mach-Zehnder interferometer with multiple arms comprising of
      an optical power separating means having at least one input port and multiple output ports, for receiving and dividing an incoming light signal injected into the input port;
      an optical power combining means having multiple input ports and at least one output port, for receiving and combining input light signals, where the final combined output signal emerges at the said output port;
      a plurality of phase modulators and ring resonator/modulators capable of modulating the phase of the light input signal passing therethrough, with each said modulators having an input port and output port, and associated electrode means for applying the modulating electrical voltages thereto; where at least one pair of the said phase modulator and the said ring resonator/modulator are coupled to at least one arm of the interferometer;
      a bias controller means for controlling the arm length differences between the different arms of the interferometer, comprising of direct current bias electrode means in each arms for receiving direct current bias voltages in order to set the levels at predetermined values;
   an electrical drive means having at least an one input electrical signal source whose electrical power is split into multiple parts by at least an electrical power splitting means such that the modulating electrical voltages are adapted and applied to the corresponding electrode means of the said plurality of modulators and interferometer arms.

2. The apparatus of claim 1, wherein the said Mach-Zehnder interferometer having two arms; the first arm and second arm in which at least one of the arms of the interferometer having a chain of modulators comprising of at least one of the said phase modulator and at least one of the said ring resonator/modulator in cascade arrangement so that the input port of first modulator in the said chain of modulators is coupled to one of the two corresponding output ports of the said optical power separating means while the output port of last modulator in the said chain of modulators is coupled to the corresponding input port of the said optical power combining means so that the corresponding input signals injected into the two arms of the interferometer are combined with the output signal emerging at the output port of the said optical power combining means.

3. The apparatus of claim 1, wherein the said Mach-Zehnder interferometer having two arms; the first and second arms in which the first arm of the interferometer having a chain of modulators comprising of at least one of the said phase modulator, and the second arm of the interferometer having a chain of modulators comprising of at least one of the said ring modulator wherein the two said chains to modulators form parallel arrangement; such that the corresponding input ports of the said chains of modulators are coupled to the corresponding output ports of the said optical power separating means while their corresponding output ports of said chain of modulators are coupled to the corresponding input ports of the said optical power combining means so that the corresponding input signals injected into the two arms of the interferometer that propagate through the said chains of modulators are combined with the final output signal emerging at the output port of the said optical power combining means.

4. The apparatus of claim 1, wherein the said substrate is selected from the group of materials consisting of lithium niobate (LN), polymer, and semiconductor materials.

5. The apparatus of claim 1, where the said ring resonator/modulator comprises an element selected from the group consisting of ring resonator/modulator implemented with waveguide, ring resonator implemented with micro-ball, and ring resonator implemented with photonic bandgap (PBG) which could all have fixed coupling coefficient or adjustable coupling coefficient.

6. The apparatus of claim 1, further includes compensating means comprising an optical receiving means for tapping a portion of the output signal light to use as feedback signal; and a processor module for receiving feedback signal and generating corresponding electrical control signals that are applied to the corresponding electrode means to adjust the parameters of the coupling coefficients of ring resonators, bias levels of the interferometer, and RF power splitting ratio to compensate for deviations from predetermined values.

7. The apparatus of claim 1, wherein the said optical power separating means and the said optical power combining means containing element selected from the group consisting of Y-junction waveguide splitter, waveguide directional coupler, and waveguide polarization beamsplitter/combiner.

8. The apparatus of claim 1, where the said ring resonator/modulator operates in a non-resonance condition.

9. The apparatus of claim 1, where the ratio of the circumference length of the said ring resonator/modulator and the modulating length of the said phase modulator is between 0.90 to 1.25.

10. The apparatus of claim 1, further including a plurality of said apparatus which are interconnected in series such that the input port of the first apparatus is coupled to an incoming light input signal, output port of first apparatus is connected to the input of the next apparatus and thereof in order to form a chain of said apparatus whereby the final output signal provides improved linearity of the modulating signal.

11. An apparatus for linearly modulating a light signal, comprising:
   a substrate of material having an electro-optic effect;
   a Michelson interferometer with multiple arms comprising of
      an optical power separating/combining means having first input port, second input port, and multiple output ports, for receiving and dividing an incoming light signal coming from the first input port; and also capable of receiving and combining signals coming from the multiple output ports in reverse direction such that the recombine output signal emerges at the second input port;
      a plurality of phase modulators, transmissive ring resonators/modulators, and reflective all-pass-resonator/modulators capable of modulating the phase of the light input signal passing therethrough, with each said phase modulators ring resonators/modulators and reflective all-pass-resonator/modulators have associated electrode means for applying the modulating electrical voltages thereto; with each of the said phase modulators and ring resonators/modulators have a separate input port and output port while each of the said reflective all-pass-resonator/modulators have shared input/output ports; where at least one pair of the said phase modulator and the said reflective all-pass-resonator/modulators are coupled to at least one arm of the interferometer;

a plurality of reflector which are intended to reflect back the input signals propagating to corresponding arms of the interferometer, which are connected at the end parts of each waveguide arms having no reflective all-pass-resonator/modulators coupled onto the corresponding arms, so that the corresponding input signals are returned back to its respective input port in the reverse direction; so that these said reflected signals are combined as output signal that emerges at the second input port of the said optical power separating/combining means;

a bias controller means for controlling the arm length differences between the different arms of the interferometer, comprising of direct current bias electrode means in each arms for receiving direct current bias voltages in order to set the levels at predetermined values;

an electrical drive means having at least an one input electrical signal source whose electrical power is split into multiple parts by at least an electrical power splitting means such that the modulating electrical voltages are adapted and applied to the corresponding electrode means of the said plurality of modulating banks and interferometer electrodes.

12. The apparatus of claim 11, wherein the said Michelson interferometer having two arms; the first arm and the second arm in which at least one of the arms of the interferometer having a chain of modulators comprising of at least one of the said phase modulator and at least one of the said reflective all-pass-resonator/modulators in cascade arrangement so that the input port of first phase modulator in the said chain of modulators is coupled to the corresponding output port of the said optical power separating/combining means while the last modulator of the said chain of modulators is a reflective all-pass-resonator/modulators; where in the corresponding input signals injected into the two arms of the interferometer and propagate through the said chain of modulators are reflected back with the combined output signal emerging at the second input port of the said optical power separating/combining means.

13. The apparatus of claim 11, wherein the said Michelson interferometer having two arms the first arm and the second arm; with the first arm of the interferometer having a chain of modulators comprising of at least one of the said phase modulator whose output port is coupled to a reflector, and the second arm of the interferometer having a chain of modulators comprising of at least one of the said reflective all-pass-resonator/modulator, so that the corresponding input signals injected into the two arms of the interferometer are reflected back with the combined output signal emerging at the second input port of the said optical power separating/combining means.

14. The apparatus of claim 11, wherein the said substrate is selected from the group of materials consisting of lithium niobate (LN), polymer, and semiconductor materials.

15. The apparatus of claim 11, where the said reflective all-pass resonator/modulator comprises an element selected from the group consisting of ring resonator (RR) with fixed coupling coefficient whose output port is coupled to a reflector, ring resonator (RR) with adjustable coupling coefficient whose output port is coupled to a reflector, fiber Bragg grating (FBG) with fixed coupling coefficient, fiber Bragg grating (FBG) with adjustable coupling coefficient, Gires-Tournois resonator (GTR) with fixed front reflection coefficient, and Gires-Tournois resonator (GTR) with adjustable front reflection coefficient.

16. The apparatus of claim 11, further includes compensating means comprising an optical receiving means for tapping a portion of the output signal light to use feedback signal; and a feedback control module for receiving feedback signal and generating corresponding electrical control signals that are applied to the corresponding electrode means to adjust the parameters of the coupling coefficients of all-pass-resonators/modulators, bias levels of the interferometer, and RF power splitting ratio to compensate for deviations from predetermined values.

17. The apparatus of claim 11, wherein the said optical power separating/combining means containing element selected from the group consisting of optical circulator coupled to a Y-junction waveguide splitter, waveguide directional coupler, and waveguide polarization beamsplitter/combiner.

18. The apparatus of claim 11, where the said reflective all-pass-resonator/modulator operates in a non-resonance condition.

19. The apparatus of claim 11, where the ratio of the circumference length of the ring resonator/modulator and the modulating length of the phase modulator is between 0.90 to 1.25.

20. An apparatus for linearly modulating a light signal, comprising:

a substrate of material having an electro-optic effect;

a Sagnac interferometer with two arms comprising of
an optical polarization separating/combining means having first input port, second input port, and first and output ports, for receiving and dividing non-polarized incoming light signal injected into first input port, and is also capable of receiving and combining signals from the output ports coming in reverse direction such that the combine output signal emerges at the second input port;

a plurality of phase modulators and ring resonators/modulators, capable of modulating the phase of the light input signal passing therethrough, with each said phase modulators and ring resonators/modulators having respective input port, output port, and associated electrode means for applying the modulating electrical voltages thereto, where at least one pair of cascaded phase modulator and ring resonators/modulators is coupled to the arm of the interferometer, such that the input port of first modulator in the said cascaded modulators is coupled to the first output port of the said optical polarization separating/combining means while the output of the last modulator of the said cascaded modulators is coupled to second output port of the said optical polarization separating/combining means to form a close-loop configuration, where the input signals injected into the interferometer propagate bi-directionally around the close-loop so that the combined output signal emerges at the second input port of the said optical power separating/combining means;

a bias controller means for controlling the arm length differences between the different arms of the interferometer, comprising of direct current bias electrode means in each arms for receiving direct current bias voltages in order to set the levels at predetermined values;

an electrical drive means having at least an one input electrical signal source whose electrical power is split into multiple parts by at least an electrical power splitting means such that the modulating electrical voltages are adapted and applied to the corresponding electrode means of the said plurality of modulating banks and interferometer electrodes.

21. The apparatus of claim 20, wherein the said substrate is selected from the group of materials consisting of lithium niobate (LN), polymer, and semiconductor materials.

22. The apparatus of claim 20, where the said ring resonator/modulator comprises an element selected from the group consisting of ring resonator/modulator implemented with waveguide, ring resonator implemented with microball, and ring resonator implemented with photonic bandgap (PBG) which could all have fixed coupling coefficient or adjustable coupling coefficient.

23. The apparatus of claim 20, further includes compensating means comprising an optical receiving means for tapping a portion of the output signal light to use as feedback signal, and a processor module for receiving feedback signal and generating corresponding electrical control signals that are applied to the corresponding electrode means to adjust the parameters of the coupling coefficients of ring resonators, bias levels of the interferometer, and RF power splitting ratio to compensate for deviations from predetermined values.

24. The apparatus of claim 20, where the said ring resonator/modulator operates in a non-resonance condition.

25. The apparatus of claim 20, further including a plurality of said apparatus which are interconnected in series such that the input port of the first apparatus is coupled to an incoming light input signal, output port of first apparatus is connected to the input of the next apparatus and thereof in order to form a chain of said apparatus whereby the final output signal provides improved linearity of the modulating signal.

* * * * *